(12) United States Patent
Zhu et al.

(10) Patent No.: US 11,359,707 B2
(45) Date of Patent: Jun. 14, 2022

(54) HYDRO-MECHANICAL TRANSMISSION DEVICE WITH DUAL-CLUTCH TRANSMISSION AND CONTROL METHOD THEREOF

(71) Applicant: JIANGSU UNIVERSITY, Zhenjiang (CN)

(72) Inventors: Zhen Zhu, Zhenjiang (CN); Yingfeng Cai, Zhenjiang (CN); Long Chen, Zhenjiang (CN); Changgao Xia, Zhenjiang (CN); Xiang Tian, Zhenjiang (CN); Jiajia Wang, Zhenjiang (CN); Falin Zeng, Zhenjiang (CN); Xiaodong Sun, Zhenjiang (CN); Dehua Shi, Zhenjiang (CN); Xing Xu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/274,440

(22) PCT Filed: Feb. 26, 2020

(86) PCT No.: PCT/CN2020/076686
§ 371 (c)(1),
(2) Date: Mar. 9, 2021

(87) PCT Pub. No.: WO2021/164044
PCT Pub. Date: Aug. 26, 2021

(65) Prior Publication Data
US 2021/0356024 A1    Nov. 18, 2021

(30) Foreign Application Priority Data
Feb. 19, 2020    (CN) .......................... 202010101329.2

(51) Int. Cl.
*F16H 47/04*    (2006.01)

(52) U.S. Cl.
CPC ....... *F16H 47/04* (2013.01); *F16H 2047/045* (2013.01); *F16H 2200/0065* (2013.01);
(Continued)

(58) Field of Classification Search
CPC ............... F16H 2047/045; F16H 47/04; F16H 2200/2007
See application file for complete search history.

(56) References Cited

U.S. PATENT DOCUMENTS

| 11,155,154 B1 * | 10/2021 | Chen | B60K 6/48 |
| 2010/0024409 A1 * | 2/2010 | Shiina | F16H 61/431 60/327 |

(Continued)

FOREIGN PATENT DOCUMENTS

| CN | 101473147 A | 7/2009 |
| CN | 101504061 A | 8/2009 |

(Continued)

*Primary Examiner* — Erin D Bishop
(74) *Attorney, Agent, or Firm* — Bayramoglu Law Offices LLC

(57) ABSTRACT

A hydro-mechanical transmission device with a dual-clutch transmission includes an input mechanism, a pump-controlled motor mechanism, an odd-numbered gear transmission mechanism, an even-numbered gear transmission mechanism, an output mechanism, and a jackshaft. The input mechanism is connected to the odd-numbered gear transmission mechanism and the even-numbered gear transmission mechanism that are connected in parallel, and is connected to an input end of the pump-controlled motor mechanism. An output end of the pump-controlled motor mechanism is connected, through the jackshaft, to the odd-numbered gear transmission mechanism and the even-numbered gear transmission mechanism that are connected in parallel, and is connected to the output mechanism. Switching among hydraulic transmission, hydro-mechanical transmission, and mechanical transmission modes between the (Continued)

input mechanism and the output mechanism is implemented by controlling combination and engagement/disengagement of clutches and a brake.

4 Claims, 8 Drawing Sheets

(52) U.S. Cl.
CPC ............... *F16H 2200/0095* (2013.01); *F16H 2200/2007* (2013.01); *F16H 2200/2061* (2013.01)

(56) References Cited

U.S. PATENT DOCUMENTS

| | | |
|---|---|---|
| 2015/0072823 A1 | 3/2015 | Rintoo |
| 2016/0114668 A1* | 4/2016 | Zhang ..................... B60K 6/12 74/732.1 |

FOREIGN PATENT DOCUMENTS

| | | |
|---|---|---|
| CN | 107191567 A | 9/2017 |
| CN | 108591411 A | 9/2018 |
| CN | 109578544 A | 4/2019 |
| CN | 109723789 A | 5/2019 |
| CN | 110005767 A | 7/2019 |
| CN | 110345245 A | 10/2019 |
| JP | H1182677 A | 3/1999 |
| WO | 2019091953 A1 | 5/2019 |

* cited by examiner

| Gear | Gear-shift mechanism | | | | | | | | | | | Output-input relationship |
|---|---|---|---|---|---|---|---|---|---|---|---|---|
| | $L_0$ | $L_1$ | $L_2$ | $L_3$ | $L_4$ | $L_5$ | $L_6$ | $L_7$ | $L_8$ | $L_9$ | $L_{10}$ | $B_1$ |
| F(H) | ▲ | ▲ | ▲ | △ | △ | △ | △ | △ | △ | △ | △ | △ | $n_o[F_1(H)] = en_e$ |
| R(H) | ▲ | ▲ | ▲ | △ | △ | △ | △ | △ | △ | △ | △ | △ | $n_o[F_1(H)] = en_e$ |
| $F_1$(HM) | ▲ | ▲ | △ | ▲ | ▲ | △ | △ | △ | △ | △ | △ | △ | $n_o[F_1(HM)] = \dfrac{\dfrac{k_1}{i_1 i_2} + \dfrac{e}{i_5 i_6}}{(k_1 + 1) i_9 i_{13}} n_e$ |
| $F_2$(HM) | ▲ | ▲ | △ | △ | △ | △ | △ | ▲ | ▲ | △ | △ | △ | $n_o[F_2(HM)] = \dfrac{\dfrac{k_2+1}{i_3 i_4} - \dfrac{e}{i_7 i_8}}{k_2 i_{14} i_{18}} n_e$ |
| $F_3$(HM) | ▲ | ▲ | △ | ▲ | △ | ▲ | △ | △ | △ | △ | △ | △ | $n_o[F_3(HM)] = \dfrac{\dfrac{k_1}{i_1 i_2} + \dfrac{e}{i_5 i_6}}{(k_1 + 1) i_{10} i_{13}} n_e$ |
| $F_4$(HM) | ▲ | ▲ | △ | △ | △ | △ | △ | ▲ | △ | ▲ | △ | △ | $n_o[F_4(HM)] = \dfrac{\dfrac{k_2+1}{i_3 i_4} - \dfrac{e}{i_7 i_8}}{k_2 i_{15} i_{18}} n_e$ |
| $R_1$(HM) | ▲ | ▲ | △ | ▲ | △ | △ | ▲ | △ | △ | △ | △ | △ | $n_o[R_1(HM)] = -\dfrac{\dfrac{k_1}{i_1 i_2} + \dfrac{e}{i_5 i_6}}{(k_1 + 1) i_{11} i_{12} i_{13}} n_e$ |
| $R_2$(HM) | ▲ | ▲ | △ | △ | △ | △ | △ | ▲ | △ | △ | ▲ | △ | $n_o[R_2(HM)] = -\dfrac{\dfrac{k_2+1}{i_3 i_4} - \dfrac{e}{i_7 i_8}}{k_2 i_{16} i_{17} i_{18}} n_e$ |
| $F_1$(M) | △ | △ | △ | ▲ | ▲ | △ | △ | △ | △ | △ | △ | ▲ | $n_o[F_1(M)] = \dfrac{\dfrac{k_1}{i_1 i_2}}{(k_1 + 1) i_9 i_{13}} n_e$ |
| $F_2$(M) | △ | △ | △ | △ | △ | △ | △ | ▲ | ▲ | △ | △ | ▲ | $n_o[F_2(M)] = \dfrac{\dfrac{k_2+1}{i_3 i_4}}{k_2 i_{14} i_{18}} n_e$ |
| $F_3$(M) | △ | △ | △ | ▲ | △ | ▲ | △ | △ | △ | △ | △ | ▲ | $n_o[F_3(M)] = \dfrac{\dfrac{k_1}{i_1 i_2}}{(k_1 + 1) i_{10} i_{13}} n_e$ |
| $F_4$(M) | △ | △ | △ | △ | △ | △ | △ | ▲ | △ | ▲ | △ | ▲ | $n_o[F_4(M)] = \dfrac{\dfrac{k_2+1}{i_3 i_4}}{k_2 i_{15} i_{18}} n_e$ |
| $R_1$(M) | △ | △ | △ | ▲ | △ | △ | ▲ | △ | △ | △ | △ | ▲ | $n_o[R_1(HM)] = -\dfrac{\dfrac{k_1}{i_1 i_2}}{(k_1 + 1) i_{11} i_{12} i_{13}} n_e$ |
| $R_2$(M) | △ | △ | △ | △ | △ | △ | △ | ▲ | △ | △ | ▲ | ▲ | $n_o[R_2(HM)] = -\dfrac{\dfrac{k_2+1}{i_3 i_4}}{k_2 i_{16} i_{17} i_{18}} n_e$ |

Note:
1. ▲ stands for engagement state of a gear-shift mechanism, and △ stands for disengagement state of a gear-shift mechanism;
2. F stands for forward gear, R stands for reverse gear, H stands for hydraulic transmission, M stands for mechanical transmission, HM stands for hydro-mechanical transmission, $n_o$ is output speed, and $n_e$ is engine speed;
3. $i_1$-$i_{18}$ are transmission ratios of ordinary gears, $k_1$ and $k_2$ are characteristic parameters of planetary gears, and $e$ is displacement ratio of a pump-controlled motor mechanism.

FIG. 3

HYDRO-MECHANICAL TRANSMISSION DEVICE WITH DUAL-CLUTCH TRANSMISSION AND CONTROL METHOD THEREOF

CROSS REFERENCE TO THE RELATED APPLICATIONS

This application is the national phase entry of International Application No. PCT/CN2020/076686, filed on Feb. 26, 2020, which is based upon and claims priority to Chinese Patent Application No. 202010101329.2, filed on Feb. 19, 2020, the entire contents of which are incorporated herein by reference.

TECHNICAL FIELD

The present invention relates to a transmission device and a control method thereof, and in particular, to a hydro-mechanical transmission device with a dual-clutch transmission and a control method thereof, which belong to the technical field of vehicle transmission.

BACKGROUND

A dual-clutch transmission device can be adopted to jointly control the shift timing of an odd-numbered and an even-numbered gear-shift mechanism, thereby reducing the impact caused by gear shift of a vehicle. In spite of high transmission efficiency, it is difficult for the dual-clutch transmission device to truly realize gear shift without power and to fully adapt to complex working conditions. The dual-clutch transmission device basically adopts a mechanical transmission mode, and a hydro-mechanical hybrid transmission device integrating both mechanical transmission and hydraulic transmission can realize efficient continuously variable transmission. Hydraulic transmission has low efficiency, but is characterized by working at a low speed and high torque. It is of theoretical significance and practical value to design a hydro-mechanical transmission device that adopts hydraulic transmission mode for startup, hydro-mechanical transmission mode for operation, and mechanical transmission mode for transportation.

The engine of an engineering vehicle supplies power not only to a travel system, but also to a power output system, and the latter often requires more power. Whether to distribute power to the power output system, how much power is to be distributed to the power output system, and how to ensure the safety of a power distribution system are difficulties in power distribution of this type of engineering vehicles and have become the current research focus.

The existing hydro-mechanical transmission device fails to integrate the functions of dual-clutch transmission and hydro-mechanical hybrid transmission, and fails to properly handle the power matching problem between the travel system and the power output system in the transmission device.

SUMMARY

Objective of the Invention

To eliminate the defects in the prior art, the present invention provides a hydro-mechanical transmission device with a dual-clutch transmission and a control method thereof. The present invention implements shift among multiple gears in hydraulic transmission, hydro-mechanical hybrid transmission, and dual-clutch transmission modes through engagement/disengagement of a clutch assembly and a brake assembly. By integrating structural design and power distribution of the transmission device, engine power is reasonably distributed to a travel system and a power output system, thereby improving the energy utilization of the transmission device.

Technical Solution

A hydro-mechanical transmission device with a dual-clutch transmission includes an input mechanism, a pump-controlled motor mechanism, an odd-numbered gear transmission mechanism, an even-numbered gear transmission mechanism, an output mechanism, and a jackshaft, wherein the input mechanism is connected to the odd-numbered gear transmission mechanism and the even-numbered gear transmission mechanism that are connected in parallel, and is connected to an input end of the pump-controlled motor mechanism, an output end of the pump-controlled motor mechanism is connected, through the jackshaft, to the odd-numbered gear transmission mechanism and the even-numbered gear transmission mechanism that are connected in parallel, and is connected to the output mechanism; a clutch $L_0$ is arranged between the input mechanism and the input end of the pump-controlled motor mechanism, a clutch $L_1$ and a travel motor output brake $B_1$ are arranged between the output end of the pump-controlled motor mechanism and the jackshaft, and a clutch $L_2$ is arranged between the jackshaft and the output mechanism;

the odd-numbered gear transmission mechanism includes an odd-numbered gear planetary gear transmission assembly, an odd-numbered gear clutch $L_0$ and an odd-numbered gear shift assembly; the odd-numbered gear planetary gear transmission assembly includes an odd-numbered gear planetary gear sun gear, an odd-numbered gear planetary gear planet carrier, and an odd-numbered gear planetary gear ring gear; the odd-numbered gear planetary gear transmission assembly is connected to the jackshaft through the odd-numbered gear planetary gear sun gear; the odd-numbered gear planetary gear transmission assembly is connected to the input mechanism through the odd-numbered gear planetary gear ring gear; the odd-numbered gear planetary gear planet carrier is connected to the odd-numbered gear shift assembly through the odd-numbered gear clutch $L_3$; the odd-numbered gear shift assembly is connected to the output mechanism; a gear clutch is arranged between each gear of the odd-numbered gear shift assembly and the odd-numbered gear clutch $L_3$;

the even-numbered gear transmission mechanism includes an even-numbered gear planetary gear transmission assembly, an even-numbered gear clutch $L_7$, and an even-numbered gear shift assembly; the even-numbered gear planetary gear transmission assembly includes an even-numbered gear planetary gear sun gear, an even-numbered gear planetary gear planet carrier, and an even-numbered gear planetary gear ring gear; the even-numbered gear planetary gear transmission assembly is connected to the jackshaft through the even-numbered gear planetary gear sun gear; the even-numbered gear planetary gear transmission assembly is connected to the input mechanism through the even-numbered gear planetary gear planet carrier; the even-numbered gear planetary gear ring gear is connected to the even-numbered gear shift assembly through the even-numbered gear clutch $L_7$; the even-numbered gear shift assembly is connected to the output mechanism; a gear clutch is arranged between each gear of the even-numbered gear shift assembly and the even-numbered gear clutch $L_7$.

The present invention implements switching among the hydraulic transmission, hydro-mechanical transmission, and mechanical transmission modes through engagement/disengagement of the clutch assembly and the brake assembly, thereby meeting the requirements of multiple working conditions and achieving the goal of energy management.

Preferably, the pump-controlled motor mechanism includes a variable pump $P_1$, a variable pump $P_2$, a pilot-operated relief valve $V_1$, a relief valve $V_2$, a three-position four-way valve $V_4$, a two-position three-way valve $V_5$, a travel motor $M_1$, and a power output motor $M_2$; the variable pump $P_1$ has a greater flow than the variable pump $P_2$; the pilot-operated relief valve $V_1$ is arranged in a bypass oil circuit of the variable pump $P_1$; the relief valve $V_2$ is arranged in a bypass oil circuit of the variable pump $P_2$; an oil circuit where the variable pump $P_2$ is located is communicated with a control oil circuit of the pilot-operated relief valve $V_1$; an oil circuit where the variable pump $P_1$ with the pilot-operated relief valve $V_1$ is located and the oil circuit where the variable pump $P_2$ with the relief valve $V_2$ is located are connected in parallel and then communicated with the travel motor $M_1$ and the power output motor $M_2$ through the three-position four-way valve $V_4$ and the two-position three-way valve $V_5$.

Preferably, switching among hydraulic transmission, hydro-mechanical transmission, and mechanical transmission modes between the input mechanism and the output mechanism is implemented by controlling combination and engagement/disengagement of the clutches and the brake;

in hydraulic transmission, when the clutch $L_0$, the clutch $L_1$, and the clutch $L_2$ are engaged while the other clutches and the travel motor output brake $B_1$ are disengaged, power is transmitted through the pump-controlled motor mechanism and the jackshaft to the output mechanism;

in mechanical transmission, when the clutch $L_0$, the clutch $L_1$, and the clutch $L_2$ are disengaged while the travel motor output brake $B_1$ is engaged, power is transmitted to the output mechanism through the odd-numbered gear transmission mechanism and the even-numbered gear transmission mechanism that are connected in parallel;

in hydro-mechanical transmission, when the clutch $L_0$ and the clutch $L_1$ are engaged while the clutch $L_2$ and the travel motor output brake $B_1$ are disengaged, power passes through the input mechanism and is split into two parts: one part of the power passes through the pump-controlled motor mechanism to the jackshaft, while the other part of the power is transmitted to the odd-numbered gear transmission mechanism; the two parts of the power are converged at the odd-numbered gear planetary gear transmission assembly and then transmitted through the odd-numbered gear clutch $L_3$ and the odd-numbered gear shift assembly to the output mechanism; or the other part of the power is transmitted to the even-numbered gear transmission mechanism; the two parts of the power are converged at the even-numbered gear planetary gear transmission assembly and then transmitted through the even-numbered gear clutch $L_7$ and the even-numbered gear shift assembly to the output mechanism.

In a control method of the hydro-mechanical transmission device with the dual-clutch transmission, when the three-position four-way valve $V_4$ is in a left position and the two-position three-way valve $V_5$ is in a right position, the travel motor $M_1$ is connected into the oil circuit and rotates in a forward direction; when the three-position four-way valve $V_4$ is in a right position and the two-position three-way valve $V_5$ is in the right position, the travel motor $M_1$ is connected into the oil circuit and rotates in a reverse direction; when the three-position four-way valve $V_4$ is in the left position and the two-position three-way valve $V_5$ is in a left position, the travel motor $M_1$ and the power output motor $M_2$ are connected in series into the oil circuit and rotate in a forward direction; when the three-position four-way valve $V_4$ is in the right position and the two-position three-way valve $V_5$ is in the left position, the travel motor $M_1$ and the power output motor $M_2$ are connected in series into the oil circuit and rotate in a reverse direction.

Preferably, the odd-numbered gear shift assembly includes a first gear shift assembly, a third gear shift assembly, and a first reverse-gear shift assembly that are connected in parallel; the first gear shift assembly includes a first gear clutch $L_4$, the third gear shift assembly includes a third gear clutch $L_5$, and the first reverse-gear shift assembly includes a first reverse-gear clutch $L_6$; the even-numbered gear shift assembly includes a second gear shift assembly, a fourth gear shift assembly, and a second reverse-gear shift assembly that are connected in parallel; the second gear shift assembly includes a second gear clutch $L_8$, the fourth gear shift assembly includes a fourth gear clutch $L_9$, and the second reverse-gear shift assembly includes a second reverse-gear clutch $L_{10}$;

in a mechanical transmission gear $F_1(M)$ or hydro-mechanical transmission gear $F_1(HM)$, only the odd-numbered gear clutch $L_3$ and the first gear clutch $L_4$ are engaged, and power passes through the odd-numbered gear clutch $L_3$ and the first gear shift assembly to the output mechanism;

in a mechanical transmission gear $F_2(M)$ or hydro-mechanical transmission gear $F_2(HM)$, only the even-numbered gear clutch $L_7$ and the second gear clutch $L_8$ are engaged, and power passes through the even-numbered gear clutch $L_7$ and the second gear shift assembly to the output mechanism;

in a mechanical transmission gear $F_3(M)$ or hydro-mechanical transmission gear $F_3(HM)$, only the odd-numbered gear clutch $L_3$ and the third gear clutch $L_5$ are engaged, and power passes through the odd-numbered gear clutch $L_3$ and the third gear shift assembly to the output mechanism;

in a mechanical transmission gear $F_4(M)$ or hydro-mechanical transmission gear $F_4(HM)$, only the even-numbered gear clutch $L_7$ and the fourth gear clutch $L_9$ are engaged, and power passes through the even-numbered gear clutch $L_7$ and the fourth gear shift assembly to the output mechanism;

in a mechanical transmission gear $R_1(M)$ or hydro-mechanical transmission gear $R_1(HM)$, only the odd-numbered gear clutch $L_3$ and the first reverse-gear clutch $L_6$ are engaged, and power passes through the odd-numbered gear clutch $L_3$ and the first reverse-gear shift assembly to the output mechanism;

in a mechanical transmission gear $R_2(M)$ or hydro-mechanical transmission gear $R_2(HM)$, only the even-numbered gear clutch $L_7$ and the second reverse-gear clutch $L_{10}$ are engaged, and power passes through the even-numbered gear clutch $L_7$ and the second reverse-gear shift assembly to the output mechanism.

Preferably, the shift of the odd-numbered gear transmission mechanism and the even-numbered gear transmission mechanism involves a currently engaged gear clutch, a gear clutch to be engaged, a currently engaged front clutch, and a front clutch to be engaged; the engagement of the gear clutch to be engaged is based on the engagement of the front clutch to be engaged, and the gear-shift process does not concern interaction between the gear clutch to be engaged and the other clutches; an $L_B(2^7)$ orthogonal and range analysis table is established to control shift timing of each gear, and the specific method includes:

1) selecting a speed drop and jerk of an output shaft as well as total sliding friction work and shift time of a gear-shift mechanism as shift quality evaluation indexes, wherein the speed drop of the output shaft serves as an evaluation index of speed fluctuation of the output shaft during the gear-shift process, and is defined by the following formula:

$$\Delta n_o = |\bar{n}_o - n_{omin}|$$

wherein $\Delta n_o$ is speed drop (r/min) of the output shaft, $\bar{n}_o$ is steady-state output speed (r/min) of the output shaft, and $n_{omin}$ is minimum output speed (r/min) of the output shaft;

the jerk of the output shaft is produced at the moment when a gear-shift device most closely related to the output shaft is engaged, and the jerk is defined by the following formula:

$$j = \frac{d^2 u_a}{dt^2} = \frac{r_q}{i_g i_{LB}} \frac{d^2 \omega_0}{dt^2}$$

wherein j is maximum jerk (m/s³) of the output shaft and $\omega_o$ is instantaneous angular velocity (rad/s) of the output shaft;

the sliding friction work of a clutch/brake is work consumed by the clutch/brake in a sliding friction stage, and is expressed by the following formula:

$$W_{L/B} = \int_0^t T_{L/B} \Delta \omega_{L/B} dt$$

wherein $W_{L/B}$ is sliding friction work (J) of the clutch/brake, $T_{L/B}$ is friction torque ($N_m$) of the clutch/brake, and $\Delta \omega_{L/B}$ is angular velocity difference (rad/s) between driving and driven discs of the clutch/brake;

the total sliding friction work of the gear-shift mechanism is a sum of sliding friction work produced by the clutch and the brake involved in the gear-shift process, the shift time lasts from the beginning to the end of the gear shift (reaching 99% of a rotation speed of the output shaft);

2) establishing Table of $L_8(2^7)$ orthogonal tests and range analysis thereof, wherein in Table 1, "1" and "2" are two levels representing engagement order of related gear-shift components, "A", "B", "C", and "D" are four factors respectively representing the front clutch to be engaged, the currently engaged front clutch, the currently engaged gear clutch, and the gear clutch to be engaged; "A*B", "A*C", and "B×C" are corresponding interactive factors; n is a total number of tests (n=8); $K_i^F$ is a sum of test results related to an $i^{th}$ level of a factor (i∈(1, 2), F∈(A, B, C, A×B, A×C, B×C,

TABLE 1

$L_8(2^7)$ orthogonal tests and range analysis thereof

| Test No. | Column | | | | | | | Observed value |
|---|---|---|---|---|---|---|---|---|
| (i) | A | B | A × B | C | A × C | B × C | D | $y_i$ |
| 1 | 1 | 1 | 1 | 1 | 1 | 1 | 1 | $y_1$ |
| 2 | 1 | 1 | 1 | 2 | 2 | 2 | 2 | $y_2$ |
| 3 | 1 | 2 | 2 | 1 | 1 | 2 | 2 | $y_3$ |
| 4 | 1 | 2 | 2 | 2 | 2 | 1 | 1 | $y_4$ |
| 5 | 2 | 1 | 2 | 1 | 2 | 1 | 2 | $y_5$ |
| 6 | 2 | 1 | 2 | 2 | 1 | 2 | 1 | $y_6$ |
| 7 | 2 | 2 | 1 | 1 | 2 | 2 | 1 | $y_7$ |
| 8 | 2 | 2 | 1 | 2 | 1 | 1 | 2 | $y_8$ |

TABLE 1-continued $L_8(2^7)$ orthogonal tests and range analysis thereof

| Test No. | Column | | | | | | | Observed value |
|---|---|---|---|---|---|---|---|---|
| (i) | A | B | A × B | C | A × C | B × C | D | $y_i$ |
| $K_i^F$ | $K_1^F$ $K_2^F$ | | | | | | | $\sum_{i=1}^{n} y_i$ |
| $k_i^F$ | $k_1^F$ $k_2^F$ | | | | | | | $\bar{y}$ |
| $R^F$ | | | | | | | | | the symbols in Table 1 are expressed as follows:

$$k_i^F = \frac{K_i^F}{4}$$

the range is:

$$R^F = \max\{|k_i^F - k_j^F|\}$$

3) determining the order of priority of the factors and interactions according to $R^F$ in each column;

4) selecting an optimal combination of levels of each evaluation index according to $k_i^F$ in each column and with reference to a two-factor matching table;

5) determining an optimization solution:

$$\begin{cases} \xi = \sum_{k=1}^{N} \lambda_k \xi_k \\ \xi_k \in [\xi_{min}, \xi_{max}] \end{cases}$$

wherein $\xi$ is a comprehensive evaluation index, $\xi_k$ is a single evaluation index, $\xi_{min}/\xi_{max}$ is upper/lower limit of the single evaluation index, and $\lambda_k$ is a weighting coefficient.

Preferably, the shift of the odd-numbered gear transmission mechanism and the even-numbered gear transmission mechanism involves a currently engaged gear clutch, a gear clutch to be engaged, a currently engaged front clutch, and a front clutch to be engaged; the gear-shift process concerns interaction between the gear clutch to be engaged and the other clutches; an $L_{16}(2^{15})$ orthogonal and range analysis table is established to control shift timing of each gear, and the specific method includes:

1) selecting a speed drop and jerk of an output shaft as well as total sliding friction work and shift time of a gear-shift mechanism as shift quality evaluation indexes, wherein the speed drop of the output shaft serves as an evaluation index of speed fluctuation of the output shaft during the gear-shift process, and is defined by the following formula:

$$\Delta n_o = |\bar{n}_o - n_{omin}|$$

wherein $\Delta n_o$ is speed drop (r/min) of the output shaft, $\bar{n}_o$ is steady-state output speed (r/min) of the output shaft, and $n_{omin}$ is minimum output speed (r/min) of the output shaft;

the jerk of the output shaft is produced at the moment when a gear-shift device most closely related to the output shaft is engaged, and the jerk is defined by the following formula:

$$j = \frac{d^2 u_a}{dt^2} = \frac{r_q}{i_g i_{LB}} \frac{d^2 \omega_0}{dt^2}$$

wherein j is maximum jerk (m/s³) of the output shaft and $\omega_o$ is instantaneous angular velocity (rad/s) of the output shaft;

the sliding friction work of a clutch/brake is work consumed by the clutch/brake in a sliding friction stage, and is expressed by the following formula:

$$W_{L/B} = \int_0^t T_{L/B} \Delta \omega_{L/B} dt$$

wherein $W_{L/B}$ is sliding friction work (J) of the clutch/brake, $T_{L/B}$ is friction torque (N$_m$) of the clutch/brake, and $\Delta \omega_{L/B}$ is angular velocity difference (rad/s) between driving and driven discs of the clutch/brake;

the total sliding friction work of the gear-shift mechanism is a sum of sliding friction work produced by the clutch and the brake involved in the gear-shift process;

the shift time lasts from the beginning to the end of the gear shift (reaching 99% of a rotation speed of the output shaft);

2) establishing Table 2 of $L^{16}(2^{15})$ orthogonal tests and range analysis thereof, wherein in Table 2, "1" and "2" are two levels representing engagement order of related gear-shift components; "A", "B", "C", and "D" are four factors respectively representing the front clutch to be engaged, the currently engaged front clutch, the currently engaged gear clutch, and the gear clutch to be engaged; "A×B", "A×C", "B×C", "A×D", "B×D", and "C×D" are corresponding interactive factors; n is a total number of tests (n=16): $K_i^F$ is a sum of test results related to an $i^{th}$ level of a factor (i E (1, 2), FE (A, B, C, D, A×B, A×C, B×C, A×D, B×D, C×D));

the symbols in Table 2 are expressed as follows:

$$k_i^F = \frac{K_i^F}{8}$$

the range is:

$$R^F = \max\{|k_i^F - k_j^F|\}$$

3) determining the order of priority of the factors and interactions according to $R^F$ in each column;

4) selecting an optimal combination of levels of each evaluation index according to $k_i^F$ in each column and with reference to a two-factor matching table;

5) determining an optimization solution:

$$\begin{cases} \xi = \sum_{k=1}^{N} \lambda_k \xi_k \\ \xi_k \in [\xi_{min}, \xi_{max}] \end{cases}$$

wherein $\xi$ is a comprehensive evaluation index, $\xi_k$ is a single evaluation index, $\xi_{min}/\xi_{max}$ is upper/lower limit of the single evaluation index, and $\lambda_k$ is a weighting coefficient.

Preferably, the shift of the odd-numbered gear transmission mechanism and the even-numbered gear transmission mechanism involves a currently engaged gear clutch, a gear clutch to be engaged, a currently engaged front clutch, and a front clutch to be engaged; the gear-shift process concerns interaction between the gear clutch to be engaged and the other clutches, and meanwhile concerns three levels of shift time of gear-shift components; an $L_{27}(3^{13})$ orthogonal and

TABLE 2

$L_{16}(2^{15})$ orthogonal tests and range analysis thereof

| Test No. | Column | | | | | | | | | | | | | | | Observed value |
|---|---|---|---|---|---|---|---|---|---|---|---|---|---|---|---|---|
| (i) | A | B | A×B | C | A×C | B×C | Null | D | A×D | B×D | Null | C×D | Null | Null | Null | $y_i$ |
| 1 | 1 | 1 | 1 | 1 | 1 | 1 | 1 | 1 | 1 | 1 | 1 | 1 | 1 | 1 | 1 | $y_1$ |
| 2 | 1 | 1 | 1 | 1 | 1 | 1 | 1 | 2 | 2 | 2 | 2 | 2 | 2 | 2 | 2 | $y_2$ |
| 3 | 1 | 1 | 1 | 2 | 2 | 2 | 2 | 1 | 1 | 1 | 1 | 2 | 2 | 2 | 2 | $y_3$ |
| 4 | 1 | 1 | 1 | 2 | 2 | 2 | 2 | 2 | 2 | 2 | 2 | 1 | 1 | 1 | 1 | $y_4$ |
| 5 | 1 | 2 | 2 | 1 | 1 | 2 | 2 | 1 | 1 | 2 | 2 | 1 | 1 | 2 | 2 | $y_5$ |
| 6 | 1 | 2 | 2 | 1 | 1 | 2 | 2 | 2 | 2 | 1 | 1 | 2 | 2 | 1 | 1 | $y_6$ |
| 7 | 1 | 2 | 2 | 2 | 2 | 1 | 1 | 1 | 1 | 2 | 2 | 2 | 2 | 1 | 1 | $y_7$ |
| 8 | 1 | 2 | 2 | 2 | 2 | 1 | 1 | 2 | 2 | 1 | 1 | 1 | 1 | 2 | 2 | $y_8$ |
| 9 | 2 | 1 | 2 | 1 | 2 | 1 | 2 | 1 | 2 | 1 | 2 | 1 | 2 | 1 | 2 | $y_9$ |
| 10 | 2 | 1 | 2 | 1 | 2 | 1 | 2 | 2 | 1 | 2 | 1 | 2 | 1 | 2 | 1 | $y_{10}$ |
| 11 | 2 | 1 | 2 | 2 | 1 | 2 | 1 | 1 | 2 | 1 | 2 | 2 | 1 | 2 | 1 | $y_{11}$ |
| 12 | 2 | 1 | 2 | 2 | 1 | 2 | 1 | 2 | 1 | 2 | 1 | 1 | 2 | 1 | 2 | $y_{12}$ |
| 13 | 2 | 2 | 1 | 1 | 2 | 2 | 1 | 1 | 2 | 2 | 1 | 1 | 2 | 2 | 1 | $y_{13}$ |
| 14 | 2 | 2 | 1 | 1 | 2 | 2 | 1 | 2 | 1 | 1 | 2 | 2 | 1 | 1 | 2 | $y_{14}$ |
| 15 | 2 | 2 | 1 | 2 | 1 | 1 | 2 | 1 | 2 | 2 | 1 | 2 | 1 | 1 | 2 | $y_{15}$ |
| 16 | 2 | 2 | 1 | 2 | 1 | 1 | 2 | 2 | 1 | 1 | 2 | 1 | 2 | 2 | 1 | $y_{16}$ |
| $K_i^F$ $K_1^F$ $K_2^F$ | | | | | | | | | | | | | | | | $\sum_{i=1}^n y_i$ |
| $k_i^F$ $k_1^F$ $k_2^F$ $R^F$ | | | | | | | | | | | | | | | | $\bar{y}$ | range analysis table is established to control shift timing of each gear, and the specific method includes:

1) selecting a speed drop and jerk of an output shaft as well as total sliding friction work and shift time of a gear-shift mechanism as shift quality evaluation indexes, wherein the speed drop of the output shaft serves as an evaluation index of speed fluctuation of the output shaft during the gear-shift process, and is defined by the following formula:

$$\Delta n_o = |\bar{n}_o - n_{omin}|$$

wherein $\Delta n_o$ is speed drop (r/min) of the output shaft, $\bar{n}_o$ is steady-state output speed (r/min) of the output shaft, and $n_{omin}$ is minimum output speed (r/min) of the output shaft;

the jerk of the output shaft is produced at the moment when a gear-shift device most closely related to the output shaft is engaged, and the jerk is defined by the following formula:

$$j = \frac{d^2 u_a}{dt^2} = \frac{r_q}{i_g i_{LB}} \frac{d^2 \omega_0}{dt^2}$$

wherein j is maximum jerk (m/s³) of the output shaft and wo is instantaneous angular velocity (rad/s) of the output shaft;

the sliding friction work of a clutch/brake is work consumed by the clutch/brake in a sliding friction stage, and is expressed by the following formula:

$$W_{L/B} = \int_0^t T_{L/B} \Delta \omega_{L/B} dt$$

wherein $W_{L/B}$ is sliding friction work (J) of the clutch/brake, $T_{L/B}$ is friction torque (N$_m$) of the clutch/brake, and $\Delta \omega_{L/B}$ is angular velocity difference (rad/s) between driving and driven discs of the clutch/brake;

the total sliding friction work of the gear-shift mechanism is a sum of sliding friction work produced by the clutch and the brake involved in the gear-shift process;

the shift time lasts from the beginning to the end of the gear shift (reaching 99% of a rotation speed of the output shaft);

2) establishing Table 3 of $L_{27}(3^{13})$ orthogonal tests and range analysis thereof, wherein in Table 3, "1", "2", and "3" are three levels respectively representing "advanced", "simultaneous", and "delayed" engagement order of related gear-shift components; "A", "B", "C", and "D" are four factors respectively representing the front clutch to be engaged, the currently engaged front clutch, the currently engaged gear clutch, and the gear clutch to be engaged; "A×B", "A×C", "B×C", and "A×D" are corresponding interactive factors; n is a total number of tests (n=27); $K_i^F$ is a sum of test results related to an $i^{th}$ level of a factor (i∈(1, 2, 3), F∈(A, B, C, D, A×B, A×C, B×C, A×D));

TABLE 3

$L_{27}(3^{13})$ orthogonal tests and range analysis thereof

| Test No. (i) | Column | | | | | | | | | | Observed value $y_i$ |
|---|---|---|---|---|---|---|---|---|---|---|---|
| | A | B | A× B | C | A× C | B× C | Null | D | A× D | | |
| 1 | 1 | 1 | 1 1 | 1 | 1 1 1 | 1 | 1 | 1 | 1 1 | | $y_1$ |
| 2 | 1 | 1 | 1 1 | 2 | 2 2 2 | 2 | 2 | 2 | 2 2 | | $y_2$ |
| 3 | 1 | 1 | 1 1 | 3 | 3 3 3 | 3 | 3 | 3 | 3 3 | | $y_3$ |
| 4 | 1 | 2 | 2 2 | 1 | 1 1 2 | 2 | 2 | 3 | 3 3 | | $y_4$ |
| 5 | 1 | 2 | 2 2 | 2 | 2 2 3 | 3 | 3 | 1 | 1 1 | | $y_5$ |
| 6 | 1 | 2 | 2 2 | 3 | 3 3 1 | 1 | 1 | 2 | 2 2 | | $y_6$ |
| 7 | 1 | 3 | 3 3 | 1 | 1 1 3 | 3 | 3 | 2 | 2 2 | | $y_7$ |
| 8 | 1 | 3 | 3 3 | 2 | 2 2 1 | 1 | 1 | 3 | 3 3 | | $y_8$ |
| 9 | 1 | 3 | 3 3 | 3 | 3 3 2 | 2 | 2 | 1 | 1 1 | | $y_9$ |
| 10 | 2 | 1 | 2 3 | 1 | 2 3 1 | 2 | 3 | 1 | 2 3 | | $y_{10}$ |
| 11 | 2 | 1 | 2 3 | 2 | 3 1 2 | 3 | 1 | 2 | 3 1 | | $y_{11}$ |
| 12 | 2 | 1 | 2 3 | 3 | 1 2 3 | 1 | 2 | 3 | 1 2 | | $y_{12}$ |
| 13 | 2 | 2 | 3 1 | 1 | 2 3 2 | 3 | 1 | 3 | 1 2 | | $y_{13}$ |
| 14 | 2 | 2 | 3 1 | 2 | 3 1 3 | 1 | 2 | 1 | 2 3 | | $y_{14}$ |
| 15 | 2 | 2 | 3 1 | 3 | 1 2 1 | 2 | 3 | 2 | 3 1 | | $y_{15}$ |
| 16 | 2 | 3 | 1 2 | 1 | 2 3 3 | 1 | 2 | 2 | 3 1 | | $y_{16}$ |
| 17 | 2 | 3 | 1 2 | 2 | 3 1 1 | 2 | 3 | 3 | 1 2 | | $y_{17}$ |
| 18 | 2 | 3 | 1 2 | 3 | 1 2 2 | 3 | 1 | 1 | 2 3 | | $y_{18}$ |
| 19 | 3 | 1 | 3 2 | 1 | 3 2 1 | 3 | 2 | 1 | 3 1 | | $y_{19}$ |
| 20 | 3 | 1 | 3 2 | 2 | 1 3 2 | 1 | 3 | 2 | 1 3 | | $y_{20}$ |
| 21 | 3 | 1 | 3 2 | 3 | 2 1 3 | 2 | 1 | 3 | 2 1 | | $y_{21}$ |
| 22 | 3 | 2 | 1 3 | 1 | 3 2 2 | 1 | 3 | 3 | 2 1 | | $y_{22}$ |
| 23 | 3 | 2 | 1 3 | 2 | 1 3 3 | 2 | 1 | 1 | 3 2 | | $y_{23}$ |
| 24 | 3 | 2 | 1 3 | 3 | 2 1 1 | 3 | 2 | 2 | 1 3 | | $y_{24}$ |
| 25 | 3 | 3 | 2 1 | 1 | 3 2 3 | 2 | 1 | 2 | 1 3 | | $y_{25}$ |
| 26 | 3 | 3 | 2 1 | 2 | 1 3 1 | 3 | 2 | 3 | 2 1 | | $y_{26}$ |
| 27 | 3 | 3 | 2 1 | 3 | 2 1 2 | 1 | 3 | 1 | 3 2 | | $y_{27}$ |
| $K_i^F$ $K_1^F$ $K_2^F$ $K_3^F$ | | | | | | | | | | | $\sum_{i=1}^n y_i$ |
| $k_i^F$ $k_1^F$ $k_2^F$ $k_3^F$ $R^F$ | | | | | | | | | | | $\bar{y}$ | the symbols in Table 3 are expressed as follows:

$$k_i^F = \frac{K_i^F}{9}$$

the range is;

$$R^F = \max\{|k_i^F - k_j^F|\}$$

3) determining the order of priority of the factors and interactions according to $R^F$ in each column;

4) selecting an optimal combination of levels of each evaluation index according to $k_i^F$ in each column and with reference to a two-factor matching table;

5) determining an optimization solution:

$$\begin{cases} \xi = \sum_{k=1}^N \lambda_k \xi_k \\ \xi_k \in [\xi_{min}, \xi_{max}] \end{cases}$$

wherein ξ is a comprehensive evaluation index, $\xi_k$ is a single evaluation index, $\xi_{min}/\xi_{max}$ is upper/lower limit of the single evaluation index, and $\lambda_k$ is a weighting coefficient.

Beneficial effects: The present invention implements switching among the hydraulic transmission, hydro-mechanical transmission, and mechanical transmission modes through engagement/disengagement of the clutch assembly and the brake assembly, thereby meeting the requirements of multiple working conditions and achieving the goal of energy management. In hydraulic transmission, the pump-controlled motor mechanism can selectively provide a low-pressure large-flow pump or a high-pressure small-flow pump to separately or jointly drive the travel motor and the power output motor. In mechanical transmission, a dual-clutch mechanical transmission mechanism is used to reduce the impact caused by gear shift of a vehicle. In hydro-mechanical transmission, a planetary gear mechanism is used to implement multi-stage efficient continuously variable transmission. By integrating structural design and power distribution of the transmission device, engine power is reasonably distributed to a travel system and a power output system, thereby improving the energy utilization of the transmission device. Three different orthogonal analysis methods are adopted to solve the problem of shift quality optimization of a dual-clutch transmission system with different precision.

BRIEF DESCRIPTION OF THE DRAWINGS

FIG. 3 is a table showing engagement/disengagement states of mode-switching components in the present invention;

DETAILED DESCRIPTION OF THE EMBODIMENTS

The present invention is further described below with reference to the accompanying drawings and specific embodiments, but the protection scope of the present invention is not limited thereto.

Figure 1:
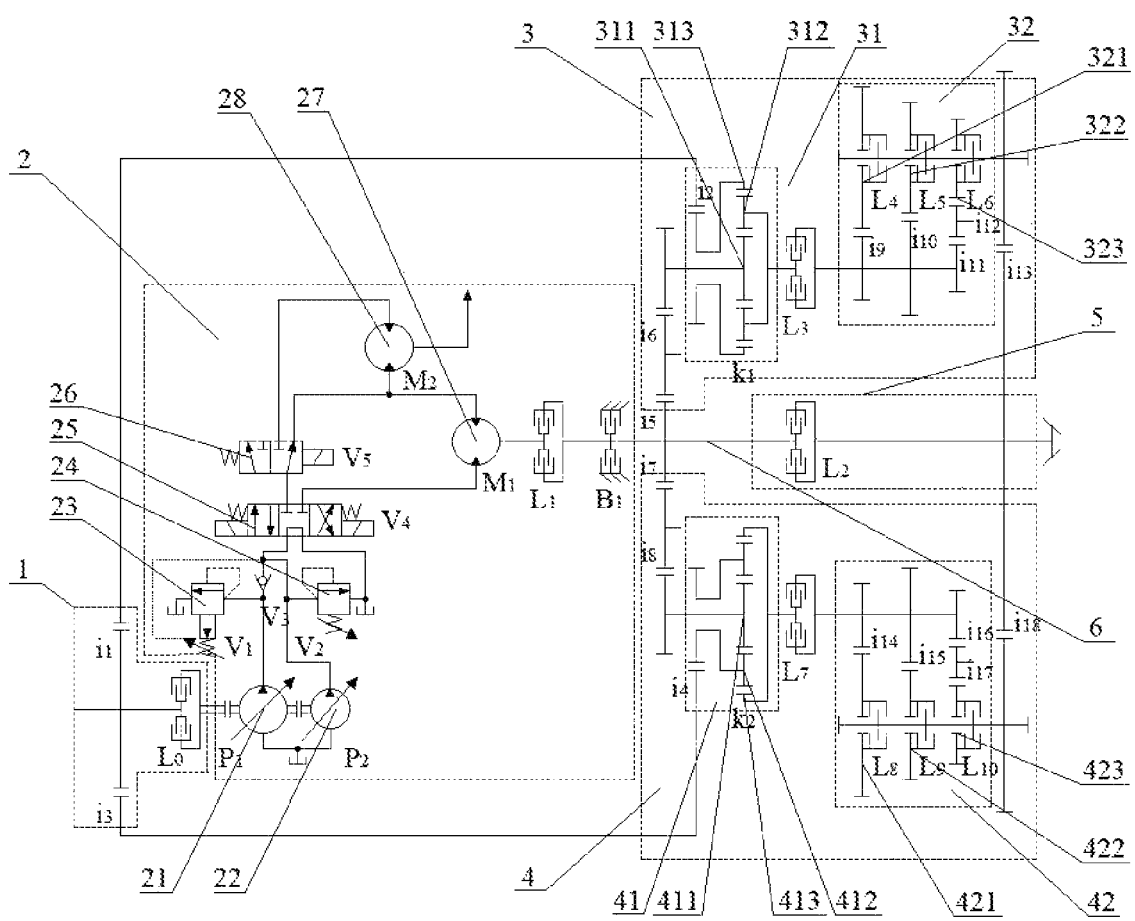
FIG. 1 is a schematic structural diagram of the present invention.
Figure 2:
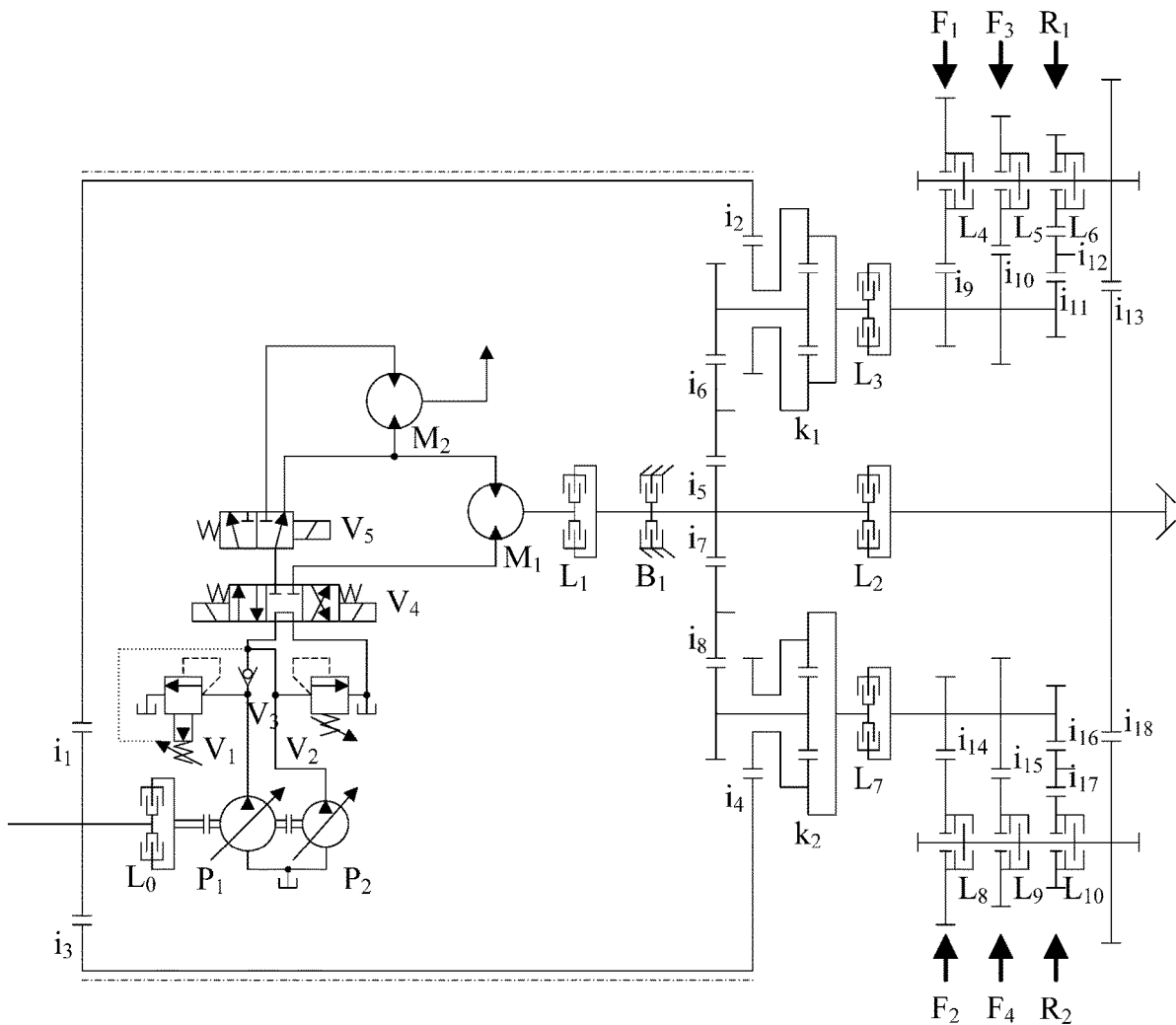
FIG. 2 is a schematic diagram showing the working principle of the present invention.

As shown in FIG. 1 and FIG. 2, a hydro-mechanical transmission device with a dual-clutch transmission includes an input mechanism 1, a pump-controlled motor mechanism 2, an odd-numbered gear transmission mechanism 3, an even-numbered gear transmission mechanism 4, an output mechanism 5, and a jackshaft 6. The input mechanism 1 is connected to the odd-numbered gear transmission mechanism 3 and the even-numbered gear transmission mechanism 4 that are connected in parallel, and is connected to an input end of the pump-controlled motor mechanism 2. An output end of the pump-controlled motor mechanism 2 is connected, through the jackshaft 6, to the odd-numbered gear transmission mechanism 3 and the even-numbered gear transmission mechanism 4 that are connected in parallel, and is connected to the output mechanism 5. A clutch $L_0$ is arranged between the input mechanism 1 and the input end of the pump-controlled motor mechanism 2, a clutch $L_1$ and a travel motor output brake $B_1$ are arranged between the output end of the pump-controlled motor mechanism 2 and the jackshaft 6, and a clutch $L_2$ is arranged between the jackshaft 6 and the output mechanism 5.

The odd-numbered gear transmission mechanism 3 includes an odd-numbered gear planetary gear transmission assembly 31, an odd-numbered gear clutch $L_3$, and an odd-numbered gear shift assembly 32. The odd-numbered gear planetary gear transmission assembly 31 includes an odd-numbered gear planetary gear sun gear 311, an odd-numbered gear planetary gear planet carrier 312, and an odd-numbered gear planetary gear ring gear 313. The odd-numbered gear planetary gear transmission assembly 31 is connected to the jackshaft 6 through the odd-numbered gear planetary gear sun gear 311. The odd-numbered gear planetary gear transmission assembly 31 is connected to the input mechanism 1 through the odd-numbered gear planetary gear ring gear 313. The odd-numbered gear planetary gear planet carrier 312 is connected to the odd-numbered gear shift assembly 32 through the odd-numbered gear clutch $L_3$. The odd-numbered gear shift assembly 32 is connected to the output mechanism 5. A gear clutch is arranged between each gear of the odd-numbered gear shift assembly 32 and the odd-numbered gear clutch $L_3$.

The odd-numbered gear shift assembly 32 includes a first gear shift assembly 321, a third gear shift assembly 322, and a first reverse-gear shift assembly 323 that are connected in parallel. The first gear shift assembly 321 includes a first gear clutch $L_4$, the third gear shift assembly 322 includes a third gear clutch $L_5$, and the first reverse-gear shift assembly 323 includes a first reverse-gear clutch $L_6$.

The even-numbered gear transmission mechanism 4 includes an even-numbered gear planetary gear transmission assembly 41, an even-numbered gear clutch $L_7$, and an even-numbered gear shift assembly 42. The even-numbered gear planetary gear transmission assembly 41 includes an even-numbered gear planetary gear sun gear 411, an even-numbered gear planetary gear planet carrier 412, and an even-numbered gear planetary gear ring gear 413. The even-numbered gear planetary gear transmission assembly 41 is connected to the jackshaft 6 through the even-numbered gear planetary gear sun gear 411. The even-numbered gear planetary gear transmission assembly 41 is connected to the input mechanism 1 through the even-numbered gear planetary gear planet carrier 412. The even-numbered gear planetary gear ring gear 413 is connected to the even-numbered gear shift assembly 42 through the even-numbered gear clutch $L_7$. The even-numbered gear shift assembly 42 is connected to the output mechanism 5. A gear clutch is arranged between each gear of the even-numbered gear shift assembly 42 and the even-numbered gear clutch $L_7$.

The even-numbered gear shift assembly 42 includes a second gear shift assembly 421, a fourth gear shift assembly 422, and a second reverse-gear shift assembly 423 that are connected in parallel. The second gear shift assembly 421 includes a second gear clutch $L_5$, the fourth gear shift assembly 422 includes a fourth gear clutch $L_9$, and the second reverse-gear shift assembly 423 includes a second reverse-gear clutch $L_{10}$.

The pump-controlled motor mechanism 2 includes a variable pump $P_1$ 21, a variable pump $P_2$ 22, a pilot-operated relief valve $V_1$ 23, a relief valve $V_2$ 24, a three-position four-way valve $V_4$ 25, a two-position three-way valve $V_5$ 26, a travel motor $M_1$ 27, and a power output motor $M_2$ 28. The variable pump $P_1$ 21 has a greater flow than the variable pump $P_2$ 22. The pilot-operated relief valve $V_1$ 23 is arranged in a bypass oil circuit of the variable pump $P_1$ 21. The relief valve $V_2$ 24 is arranged in a bypass oil circuit of the variable pump $P_2$ 22. An oil circuit where the variable pump $P_2$ 22 is located is communicated with a control oil circuit of the pilot-operated relief valve $V_1$ 23. An oil circuit where the variable pump $P_1$ 21 with the pilot-operated relief valve $V_1$ 23 is located and the oil circuit where the variable pump $P_2$ 22 with the relief valve $V_2$ 24 is located are connected in parallel and then communicated with the travel motor $M_1$ 27 and the power output motor $M_2$ 28 through the three-position four-way valve $V_4$ 25 and the two-position three-way valve $V_5$ 26.

As shown in FIG. 3, according to a control method of the hydro-mechanical transmission device with the dual-clutch transmission, switching among hydraulic transmission, hydro-mechanical transmission, and mechanical transmission modes between the input mechanism 1 and the output mechanism 5 is implemented by controlling combination and engagement/disengagement of the clutches and the brake.

In hydraulic transmission, when the clutch 14, the clutch $L_1$, and the clutch $L_2$ are engaged while the other clutches and the travel motor output brake $B_1$ are disengaged, power is transmitted through the pump-controlled motor mechanism 2 and the jackshaft 6 to the output mechanism 5.

In mechanical transmission, only when the odd-numbered gear clutch $L_3$, the first gear clutch $L_4$, and the travel motor output brake $B_1$ are engaged while the other clutches are disengaged, the device is in a mechanical transmission gear $F_1(M)$, and power is transmitted through the input mechanism 1, the odd-numbered gear planetary gear ring gear 313, the odd-numbered gear planetary gear planet carrier 312, the odd-numbered gear clutch $L_3$, and the first gear clutch $L_4$ to the output mechanism 5;

only when the even-numbered gear clutch $L_7$, the second gear clutch $L_5$, and the travel motor output brake $B_1$ are engaged while the other clutches are disengaged, the device is in a mechanical transmission gear $F_2(M)$, and power is transmitted through the input mechanism 1, the even-numbered gear planetary gear planet carrier 412, the even-numbered gear planetary gear ring gear 413, the even-numbered gear clutch $L_7$, and the second gear clutch $L_5$ to the output mechanism 5;

only when the odd-numbered gear clutch $L_3$, the third gear clutch $L_5$, and the travel motor output brake $B_1$ are engaged while the other clutches are disengaged, the device is in a mechanical transmission gear $F_3(M)$, and power is transmitted through the input mechanism 1, the odd-numbered gear planetary gear ring gear 313, the odd-numbered gear planetary gear planet carrier 312, the odd-numbered gear clutch $L_3$, and the third gear clutch $L_5$ to the output mechanism 5;

only when the even-numbered gear clutch $L_7$, the fourth gear clutch $L_9$, and the travel motor output brake $B_1$ are engaged while the other clutches are disengaged, the device is in a mechanical transmission gear $F_4(M)$, and power is transmitted through the input mechanism 1, the even-numbered gear planetary gear planet carrier 412, the even-numbered gear planetary gear ring gear 413, the even-numbered gear clutch $L_7$, and the fourth gear clutch $L_9$ to the output mechanism 5;

only when the odd-numbered gear clutch $L_3$, the first reverse-gear clutch $L_6$, and the travel motor output brake $B_1$ are engaged while the other clutches are disengaged, the device is in a mechanical transmission gear $R_1(M)$, and power is transmitted through the input mechanism 1, the odd-numbered gear planetary gear ring gear 313, the odd-numbered gear planetary gear planet carrier 312, the odd-numbered gear clutch $L_3$, and the first reverse-gear clutch $L_6$ to the output mechanism 5;

only when the even-numbered gear clutch $L_7$, the second reverse-gear clutch $L_{10}$, and the travel motor output brake $B_1$ are engaged while the other clutches are disengaged, the device is in a mechanical transmission gear $R_2(M)$, and power is transmitted through the input mechanism 1, the even-numbered gear planetary gear planet carrier 412, the even-numbered gear planetary gear ring gear 413, the even-numbered gear clutch $L_7$, and the second reverse-gear clutch $L_{10}$ to the output mechanism 5.

In hydro-mechanical transmission, only when the clutch $L_0$, the clutch $L_1$, the odd-numbered gear clutch $L_3$, and the first gear clutch $L_4$ are engaged while the other clutches and the travel motor output brake $B_1$ are disengaged, the device is in a hydro-mechanical transmission gear $F_1(HM)$, and power passes through the input mechanism 1 and is split into two parts: one part of the power passes through the pump-controlled motor mechanism 2 and the jackshaft 6 to the odd-numbered gear planetary gear sun gear 311, while the other part of the power passes through the odd-numbered gear planetary gear ring gear 313; the two parts of the power are converged at the odd-numbered gear planetary gear planet carrier 312 and then transmitted through the odd-numbered gear clutch $L_3$ and the first gear clutch $L_4$ to the output mechanism 5;

only when the clutch $L_0$, the clutch $L_1$, the even-numbered gear clutch $L_7$, and the second gear clutch $L_8$ are engaged while the other clutches and the travel motor output brake $B_1$ are disengaged, the device is in a hydro-mechanical transmission gear $F_2(HM)$, and power passes through the input mechanism 1 and is split into two parts: one part of the power passes through the pump-controlled motor mechanism 2 and the jackshaft 6 to the even-numbered gear planetary gear sun gear 411, while the other part of the power passes through the even-numbered gear planetary gear planet carrier 412; the two parts of the power are converged at the even-numbered gear planetary gear ring gear 413 and then transmitted through the even-numbered gear clutch $L_7$ and the second gear clutch $L_5$ to the output mechanism 5:

only when the clutch $L_0$, the clutch $L_1$, the odd-numbered gear clutch $L_3$, and the third gear clutch $L_5$ are engaged while the other clutches and the travel motor output brake $B_1$ are disengaged, the device is in a hydro-mechanical transmission gear $F_3(HM)$, and power passes through the input mechanism 1 and is split into two parts: one part of the power passes through the pump-controlled motor mechanism 2 and the jackshaft 6 to the odd-numbered gear planetary gear sun gear 311, while the other part of the power passes through the odd-numbered gear planetary gear ring gear 313; the two parts of the power are converged at the odd-numbered gear planetary gear planet carrier 312 and then transmitted through the odd-numbered gear clutch $L_3$ and the third gear clutch $L_5$ to the output mechanism 5;

only when the clutch $L_0$, the clutch $L_1$, the even-numbered gear clutch $L_7$, and the fourth gear clutch $L_9$ are engaged while the other clutches and the travel motor output brake $B_1$ are disengaged, the device is in a hydro-mechanical transmission gear $F_4(HM)$, and power passes through the input mechanism 1 and is split into two parts: one part of the power passes through the pump-controlled motor mechanism 2 and the jackshaft 6 to the even-numbered gear planetary gear sun gear 411, while the other part of the power passes through the even-numbered gear planetary gear planet carrier 412; the two parts of the power are converged at the even-numbered gear planetary gear ring gear 413 and then transmitted through the even-numbered gear clutch $L_7$ and the fourth gear clutch $L_9$ to the output mechanism 5;

only when the clutch $L_0$, the clutch $L_1$, the odd-numbered gear clutch $L_3$, and the first reverse-gear clutch L are engaged while the other clutches and the travel motor output brake $B_1$ are disengaged, the device is in a hydro-mechanical transmission gear $R_1$(HM), and power passes through the input mechanism 1 and is split into two parts: one part of the power passes through the pump-controlled motor mechanism 2 and the jackshaft 6 to the odd-numbered gear planetary gear sun gear 311, while the other part of the power passes through the odd-numbered gear planetary gear ring gear 313; the two parts of the power are converged at the odd-numbered gear planetary gear planet carrier 312 and then transmitted through the odd-numbered gear clutch $L_3$ and the first reverse-gear clutch $L_6$ to the output mechanism 5;

only when the clutch $L_0$, the clutch $L_1$, the even-numbered gear clutch $L_7$, and the second reverse-gear clutch $L_{10}$ are engaged while the other clutches and the travel motor output brake $B_1$ are disengaged, the device is in a hydro-mechanical transmission gear $R_2$(HM), and power passes through the input mechanism 1 and is split into two parts: one part of the power passes through the pump-controlled motor mechanism 2 and the jackshaft 6 to the even-numbered gear planetary gear sun gear 411, while the other part of the power passes through the even-numbered gear planetary gear planet carrier 412; the two parts of the power are converged at the even-numbered gear planetary gear ring gear 413 and then transmitted through the even-numbered gear clutch $L_7$ and the second reverse-gear clutch $L_{10}$ to the output mechanism 5.

Figure 5:
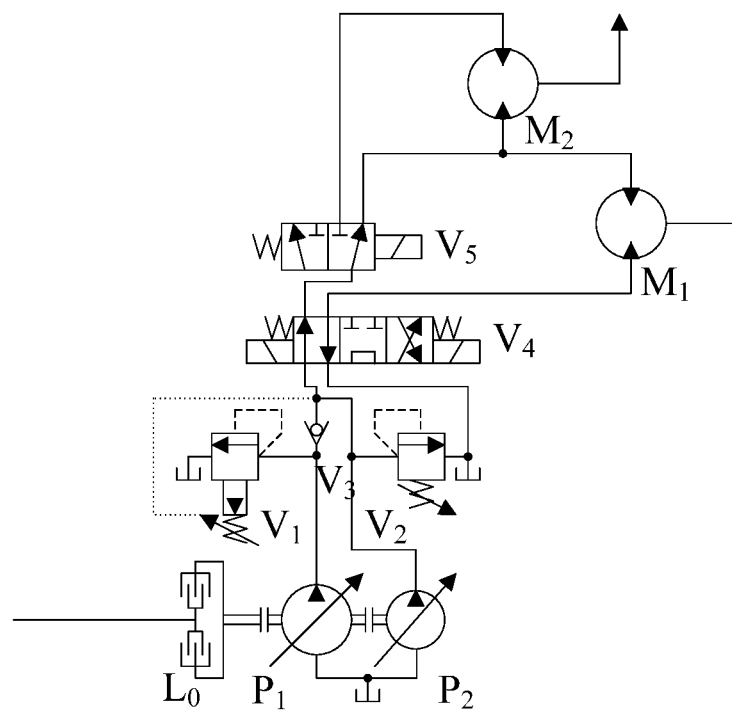
FIG. 5 is a diagram showing the working principle of forward transmission by a travel motor in the present invention.

As shown in FIG. 5, when the three-position four-way valve $V_5$ 25 is in a left position and the two-position three-way valve $V_5$ 26 is in a right position, the travel motor $M_1$ 27 is connected into the oil circuit and rotates in a forward direction.

Figure 6:
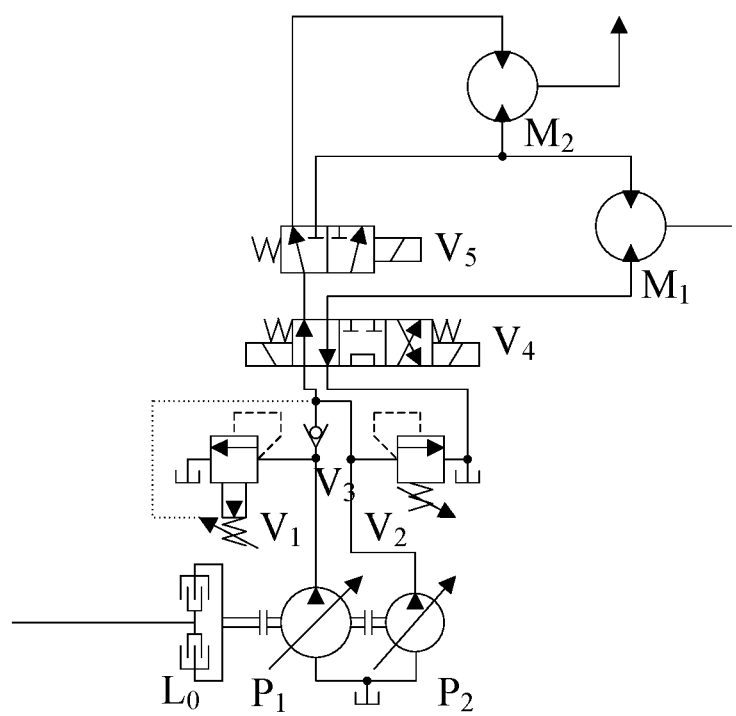
FIG. 6 is a diagram showing the working principle of forward transmission by both the travel motor and a power output motor in the present invention.

As shown in FIG. 6, when the three-position four-way valve $V_4$ 25 is in the left position and the two-position three-way valve $V_5$ 26 is in a left position, the travel motor $M_1$ 27 and the power output motor $M_2$ 28 are connected in series into the oil circuit and rotate in a forward direction.

Figure 7:
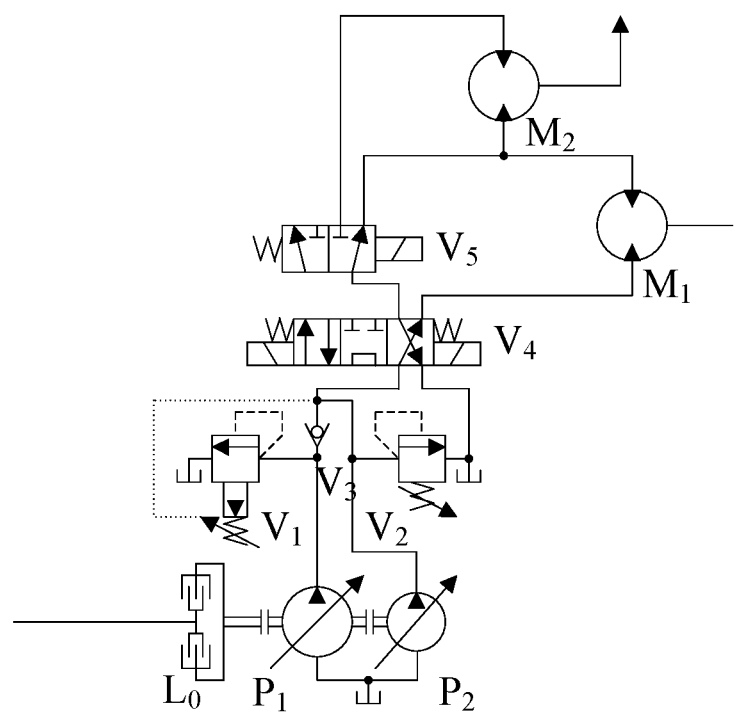
FIG. 7 is a diagram showing the working principle of reverse transmission by the travel motor in the present invention.

As shown in FIG. 7, when the three-position four-way valve $V_4$ 25 is in a right position and the two-position three-way valve $V_5$ 26 is in the right position, the travel motor $M_1$ 27 is connected into the oil circuit and rotates in a reverse direction.

Figure 8:
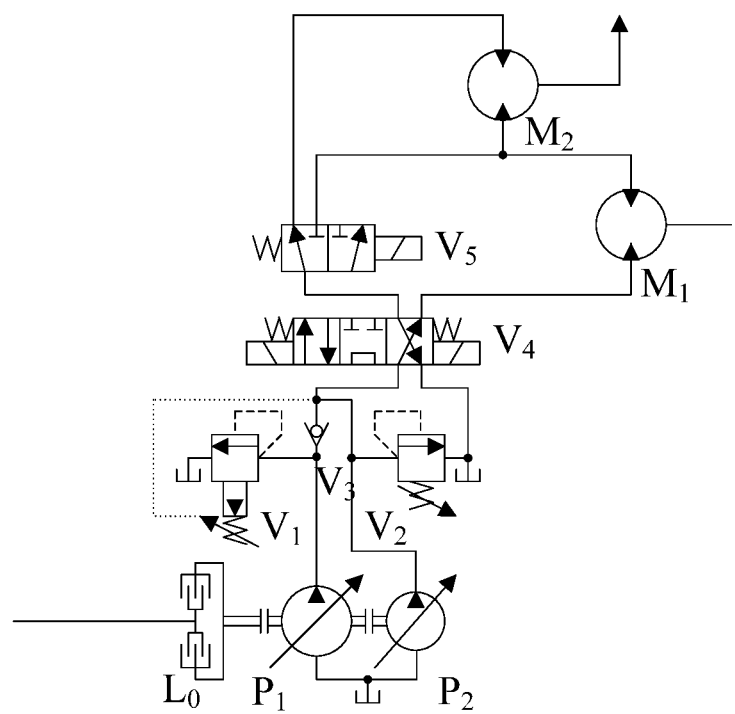
FIG. 8 is a diagram showing the working principle of reverse transmission by both the travel motor and the power output motor in the present invention.

As shown in FIG. 8, when the three-position four-way valve $V_5$ 25 is in the right position and the two-position three-way valve $V_5$ 26 is in the left position, the travel motor $M_1$ 27 and the power output motor $M_2$ 28 are connected in series into the oil circuit and rotate in a reverse direction.

In a normal working condition, the low-pressure large-flow variable pump $P_1$ 21 and the high-pressure small-flow variable pump $P_2$ 22 jointly supply oil to the three-position four-way valve $V_4$ 25, the pressure is adjusted by the pilot-operated relief valve $V_1$ 23, and the output speed is determined by both the displacement of the variable pump $P_1$ 21 and the displacement of the variable pump $P_2$ 22. Under the pressure adjusted by the pilot-operated relief valve $V_1$ 23, the power of the power output motor $M_2$ 28 is matched with the power of the travel motor $M_1$ 27, and the output speed is high. In an extreme working condition, the pressure in the pump-controlled motor mechanism 2 gradually increases, so that the pilot-operated relief valve $V_1$ 23 relieves pressure, and only the variable pump $P_2$ 22 outputs oil. Under the pressure adjusted by the relief valve $V_2$ 24, the power of the power output motor $M_2$ 28 is matched with the power of the travel motor $M_1$ 27, and the output speed is low. The clutch $L_1$ may also be disengaged, and only the power output motor $M_2$ 28 does work outwards.

The shift of the odd-numbered gear transmission mechanism 3 and the even-numbered gear transmission mechanism 4 involves a currently engaged gear clutch, a gear clutch to be engaged, a currently engaged front clutch, and a front clutch to be engaged. The engagement of the gear clutch to be engaged is based on the engagement of the front clutch to be engaged, and the gear-shift process does not concern interaction between the gear clutch to be engaged and the other clutches. An $L_8(2^7)$ orthogonal and range analysis table is established to control shift timing of each gear, thereby reducing the gear-shift impact.

Taking the shift from the gear $F_1$ to the gear $F_2$ as an example, before the shift, the odd-numbered gear clutch $L_3$ and the first gear clutch $L_4$ are engaged, while the even-numbered gear clutch $L_7$ and the second gear clutch L are disengaged. Since the odd-numbered gear planetary gear sun gear 311 meshes with the even-numbered gear planetary gear sun gear 411, after the shift, it can be considered that the odd-numbered gear clutch $L_3$, the first gear clutch $L_4$, and the even-numbered gear clutch $L_7$ interact with each other, while interaction between the second gear clutch $L_8$ and the above clutches can be ignored, and only interaction between the above three clutches are taken into account.

The specific method is as follows:

1) A speed drop and jerk of an output shaft as well as total sliding friction work and shift time of a gear-shift mechanism are selected as shift quality evaluation indexes, wherein the speed drop of the output shaft serves as an evaluation index of speed fluctuation of the output shaft during the gear-shift process, and is defined by the following formula:

$$\Delta n_o = |\bar{n}_o - n_{omin}|$$

wherein $\Delta n_o$ is speed drop (r/min) of the output shaft, $\bar{n}_o$ is steady-state output speed (r/min) of the output shaft, and $n_{omin}$ is minimum output speed (r/min) of the output shaft;

the jerk of the output shaft is produced at the moment when a gear-shift device most closely related to the output shaft is engaged, and the jerk is defined by the following formula:

$$j = \frac{d^2 u_a}{dt^2} = \frac{r_q}{i_g i_{LB}} \frac{d^2 \omega_0}{dt^2}$$

wherein j is maximum jerk (m/s³) of the output shaft and $\omega_o$ is instantaneous angular velocity (rad/s) of the output shaft;

the sliding friction work of a clutch/brake is work consumed by the clutch/brake in a sliding friction stage, and is expressed by the following formula:

$$W_{L/B} = \int_0^t T_{L/B} \Delta \omega_{L/B} dt$$

wherein $W_{L/B}$ is sliding friction work (J) of the clutch/brake, $T_{L/B}$ is friction torque ($N_m$) of the clutch/brake, and $\Delta \omega_{L/B}$ is angular velocity difference (rad/s) between driving and driven discs of the clutch/brake;

the total sliding friction work of the gear-shift mechanism is a sum of sliding friction work produced by the clutch and the brake involved in the gear-shift process;

the shift time lasts from the beginning to the end of the gear shift (reaching 99% of a rotation speed of the output shaft).

2) Table 1 of $L_8(2^7)$ orthogonal tests and range analysis thereof is established. In Table 1, "1" and "2" are two levels representing engagement order of related gear-shift components, "A", "B", "C", and "D" are four factors respectively representing the even-numbered gear clutch $L_7$, the odd-numbered gear clutch $L_3$, the first gear clutch $L_4$, and the second gear clutch $L_8$; "A×B", "A×C", and "B×C" are corresponding interactive factors; n is a total number of tests (n=8); $K_i^F$ is a sum of test results related to an $i^{th}$ level of a factor (i∈(1, 2), F∈(A, B, C, A×B, A×C, B×C, D)).

TABLE 1

$L_8(2^7)$ orthogonal tests and range analysis thereof

| Test No. (i) | A | B | A×B | C | A×C | B×C | D | Observed value $y_i$ |
|---|---|---|---|---|---|---|---|---|
| 1 | 1 | 1 | 1 | 1 | 1 | 1 | 1 | $y_1$ |
| 2 | 1 | 1 | 1 | 2 | 2 | 2 | 2 | $y_2$ |
| 3 | 1 | 2 | 2 | 1 | 1 | 2 | 2 | $y_3$ |
| 4 | 1 | 2 | 2 | 2 | 2 | 1 | 1 | $y_4$ |
| 5 | 2 | 1 | 2 | 1 | 2 | 1 | 2 | $y_5$ |
| 6 | 2 | 1 | 2 | 2 | 1 | 2 | 1 | $y_6$ |
| 7 | 2 | 2 | 1 | 1 | 2 | 2 | 1 | $y_7$ |
| 8 | 2 | 2 | 1 | 2 | 1 | 1 | 2 | $y_8$ |
| $K_i^F$ $\;\;K_1^F$ $\;\;K_2^F$ | | | | | | | | $\sum_{i=1}^{n} y_i$ |
| $k_i^F$ $\;\;k_1^F$ $\;\;k_2^F$ $\;\;R^F$ | | | | | | | | $\bar{y}$ |

The symbols in Table 1 are expressed as follows:

$$k_i^F = \frac{K_i^F}{4}$$

the range is:

$$R^F = \max\{|k_1^F - k_j^F|\}$$

3) The order of priority of the factors and interactions is determined according to $R^F$ in each column.

4) An optimal combination of levels of each evaluation index is selected according to $k_1^F$ in each column and with reference to a two-factor matching table.

5) An optimization solution is determined:

$$\begin{cases} \xi = \sum_{k=1}^{N} \lambda_k \xi_k \\ \xi_k \in [\xi_{min}, \xi_{max}] \end{cases}$$

wherein $\xi$ is a comprehensive evaluation index, $\xi_k$ is a single evaluation index, $\xi_{min}/\xi_{max}$ is upper/lower limit of the single evaluation index, and $\lambda_k$ is a weighting coefficient.

The shift from the gear $F_1$ to the gear $F_2$ is still taken as an example. In $L_8(2^7)$ orthogonal analysis, interaction between the second gear clutch $L_8$ and the odd-numbered gear clutch $L_3$, the first gear clutch $L_4$, and the even-numbered gear clutch $L_7$ are ignored. In a normal condition, the requirements of working conditions can be satisfied, and when high precision is required, interaction between the second gear clutch $L_8$ and the related clutches can be considered. An $L_{16}(2^{15})$ orthogonal and range analysis table is established to control the timing of each gear-shift mechanism, thereby reducing the gear-shift impact.

The steps are as follows:

1) A speed drop and jerk of an output shaft as well as total sliding friction work and shift time of a gear-shift mechanism are selected as shift quality evaluation indexes.

2) Table 2 of $L_{16}(2^{15})$ orthogonal tests and range analysis thereof is established. In Table 2, "1" and "2" are two levels representing engagement order of related gear-shift components; "A", "B", "C", and "D" are four factors respectively representing the even-numbered gear clutch $L_7$, the odd-numbered gear clutch $L_3$, the first gear clutch $L_4$, and the second gear clutch $L_8$; "A×B", "A×C", "B×C", "A×D", "B×D", and "C×D" are corresponding interactive factors; n is a total number of tests (n=16); $K_i^F$ is a sum of test results related to an $i^{th}$ level of a factor (i∈(1, 2), F∈(A, B, C, D, A×B, A×C, B×C, A×D, B×D, C×D)).

TABLE 2

$L_{16}(2^{15})$ orthogonal tests and range analysis thereof

| Test No. (i) | A | B | A×B | C | A×C | B×C | Null | D | A×D | B×D | Null | C×D | Null | Null | Null | Observed value $y_i$ |
|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | $y_1$ |
| 2 | 1 | 1 | 1 | 1 | 1 | 1 | 1 | 2 | 2 | 2 | 2 | 2 | 2 | 2 | 2 | $y_2$ |
| 3 | 1 | 1 | 1 | 2 | 2 | 2 | 2 | 1 | 1 | 1 | 1 | 2 | 2 | 2 | 2 | $y_3$ |
| 4 | 1 | 1 | 1 | 2 | 2 | 2 | 2 | 2 | 2 | 2 | 2 | 1 | 1 | 1 | 1 | $y_4$ |
| 5 | 1 | 2 | 2 | 1 | 1 | 2 | 2 | 1 | 1 | 2 | 2 | 1 | 1 | 2 | 2 | $y_5$ |
| 6 | 1 | 2 | 2 | 1 | 1 | 2 | 2 | 2 | 2 | 1 | 1 | 2 | 2 | 1 | 1 | $y_6$ |
| 7 | 1 | 2 | 2 | 2 | 2 | 1 | 1 | 1 | 1 | 2 | 2 | 2 | 2 | 1 | 1 | $y_7$ |
| 8 | 1 | 2 | 2 | 2 | 2 | 1 | 1 | 2 | 2 | 1 | 1 | 1 | 1 | 2 | 2 | $y_8$ |
| 9 | 2 | 1 | 2 | 1 | 2 | 1 | 2 | 1 | 2 | 1 | 2 | 1 | 2 | 1 | 2 | $y_9$ |
| 10 | 2 | 1 | 2 | 1 | 2 | 1 | 2 | 2 | 1 | 2 | 1 | 2 | 1 | 2 | 1 | $y_{10}$ |
| 11 | 2 | 1 | 2 | 2 | 1 | 2 | 1 | 1 | 2 | 1 | 2 | 2 | 1 | 2 | 1 | $y_{11}$ |
| 12 | 2 | 1 | 2 | 2 | 1 | 2 | 1 | 2 | 1 | 2 | 1 | 1 | 2 | 1 | 2 | $y_{12}$ |
| 13 | 2 | 2 | 1 | 1 | 2 | 2 | 1 | 1 | 2 | 2 | 1 | 1 | 2 | 2 | 1 | $y_{13}$ |
| 14 | 2 | 2 | 1 | 1 | 2 | 2 | 1 | 2 | 1 | 1 | 2 | 2 | 1 | 1 | 2 | $y_{14}$ |
| 15 | 2 | 2 | 1 | 2 | 1 | 1 | 2 | 1 | 2 | 2 | 1 | 2 | 1 | 1 | 2 | $y_{15}$ |
| 16 | 2 | 2 | 1 | 2 | 1 | 1 | 2 | 2 | 1 | 1 | 2 | 1 | 2 | 2 | 1 | $y_{16}$ |

TABLE 2-continued $L_{16}(2^{15})$ orthogonal tests and range analysis thereof

| Test No. (i) | Column | | | | | | | | | | | | | | | Observed value $y_i$ |
|---|---|---|---|---|---|---|---|---|---|---|---|---|---|---|---|---|
| | A | B | A×B | C | A×C | B×C | Null | D | A×D | B×D | Null | C×D | Null | Null | Null | |
| $K_i^F$ | $K_1^F$ $K_2^F$ | | | | | | | | | | | | | | | $\sum_{i=1}^{n} y_i$ |
| $k_i^F$ | $k_1^F$ $k_2^F$ $R^F$ | | | | | | | | | | | | | | | $\bar{y}$ |

The symbols in Table 2 are expressed as follows:

$$k_i^F = \frac{K_i^F}{8}$$

the range is:

$$R^F = \max\{|k_i^F - k_j^F|\}$$

3) The order of priority of the factors and interactions is determined according to $R^F$ in each column.

4) An optimal combination of levels of each evaluation index is selected according to $k_i^F$ in each column and with reference to a two-factor matching table.

5) An optimization solution is determined:

$$\begin{cases} \xi = \sum_{k=1}^{N} \lambda_k \xi_k \\ \xi_k \in [\xi_{min}, \xi_{max}] \end{cases}$$

wherein $\xi$ is a comprehensive evaluation index, $\xi_k$ is a single evaluation index, $\xi_{min}/\xi_{max}$ is upper/lower limit of the single evaluation index, and $\lambda_k$ is a weighting coefficient.

The shift from the gear $F_1$ to the gear $F_2$ is still taken as an example. The gear-shift process concerns interaction between the gear clutch to be engaged and the other clutches, and meanwhile concerns three levels of shift time of gear-shift components to further improve the precision of gear optimization. An $L_{27}(3^{13})$ orthogonal and range analysis table is established to control shift timing of each gear. The specific method is as follows:

1) A speed drop and jerk of an output shaft as well as total sliding friction work and shift time of a gear-shift mechanism are selected as shift quality evaluation indexes.

2) Table 3 of $L_{27}(3^{13})$ orthogonal tests and range analysis thereof is established. In Table 3, "1", "2", and "3" are three levels respectively representing "advanced", "simultaneous", and "delayed" engagement order of related gear-shift components; "A", "B", "C", and "D" are four factors respectively representing the even-numbered gear clutch $L_7$, the odd-numbered gear clutch $L_3$, the first gear clutch U, and the second gear clutch $L_8$; "A×B", "A×C", "B×C", and "A×D" are corresponding interactive factors, n is a total number of tests (n=27); $K_i^F$ is a sum of test results related to an $i^{th}$ level of a factor (i∈(1, 2, 3), F∈(A, B, C, D, A×B, A×C, B×C, A×D))).

TABLE 3

$L_{27}(3^{13})$ orthogonal tests and range analysis thereof

| Test No. (i) | Column | | | | | | | | | | Observed value $y_i$ |
|---|---|---|---|---|---|---|---|---|---|---|---|
| | A | B | A×B | C | A×C | B×C | Null | D | A×D | | |
| 1 | 1 | 1 | 1 1 | 1 | 1 1 1 | 1 | 1 | 1 | 1 1 | | $y_1$ |
| 2 | 1 | 1 | 1 1 | 2 | 2 2 2 | 2 | 2 | 2 | 2 2 | | $y_2$ |
| 3 | 1 | 1 | 1 1 | 3 | 3 3 3 | 3 | 3 | 3 | 3 3 | | $y_3$ |
| 4 | 1 | 2 | 2 2 | 1 | 1 1 2 | 2 | 2 | 3 | 3 3 | | $y_4$ |
| 5 | 1 | 2 | 2 2 | 2 | 2 2 3 | 3 | 3 | 1 | 1 1 | | $y_5$ |
| 6 | 1 | 2 | 2 2 | 3 | 3 3 1 | 1 | 1 | 2 | 2 2 | | $y_6$ |
| 7 | 1 | 3 | 3 3 | 1 | 1 1 3 | 3 | 3 | 2 | 2 2 | | $y_7$ |
| 8 | 1 | 3 | 3 3 | 2 | 2 2 1 | 1 | 1 | 3 | 3 3 | | $y_8$ |
| 9 | 1 | 3 | 3 3 | 3 | 3 3 2 | 2 | 2 | 1 | 1 1 | | $y_9$ |
| 10 | 2 | 1 | 2 3 | 1 | 2 3 1 | 2 | 3 | 1 | 2 3 | | $y_{10}$ |
| 11 | 2 | 1 | 2 3 | 2 | 3 1 2 | 3 | 1 | 2 | 3 1 | | $y_{11}$ |
| 12 | 2 | 1 | 2 3 | 3 | 1 2 3 | 1 | 2 | 3 | 1 2 | | $y_{12}$ |
| 13 | 2 | 2 | 3 1 | 1 | 2 3 2 | 3 | 1 | 3 | 1 2 | | $y_{13}$ |
| 14 | 2 | 2 | 3 1 | 2 | 3 1 3 | 1 | 2 | 1 | 2 3 | | $y_{14}$ |
| 15 | 2 | 2 | 3 1 | 3 | 1 2 1 | 2 | 3 | 2 | 3 1 | | $y_{15}$ |
| 16 | 2 | 3 | 1 2 | 1 | 2 3 3 | 1 | 2 | 2 | 3 1 | | $y_{16}$ |
| 17 | 2 | 3 | 1 2 | 2 | 3 1 1 | 2 | 3 | 3 | 1 2 | | $y_{17}$ |
| 18 | 2 | 3 | 1 2 | 3 | 1 2 2 | 3 | 1 | 1 | 2 3 | | $y_{18}$ |
| 19 | 3 | 1 | 3 2 | 1 | 3 2 1 | 3 | 2 | 1 | 3 1 | | $y_{19}$ |
| 20 | 3 | 1 | 3 2 | 2 | 1 3 2 | 1 | 3 | 2 | 1 3 | | $y_{20}$ |
| 21 | 3 | 1 | 3 2 | 3 | 2 1 3 | 2 | 1 | 3 | 2 1 | | $y_{21}$ |
| 22 | 3 | 2 | 1 3 | 1 | 3 2 2 | 1 | 3 | 2 | 3 1 | | $y_{22}$ |
| 23 | 3 | 2 | 1 3 | 2 | 1 3 3 | 2 | 1 | 1 | 3 2 | | $y_{23}$ |
| 24 | 3 | 2 | 1 3 | 3 | 2 1 1 | 3 | 2 | 2 | 1 3 | | $y_{24}$ |
| 25 | 3 | 3 | 2 1 | 1 | 3 2 3 | 2 | 1 | 2 | 1 3 | | $y_{25}$ |
| 26 | 3 | 3 | 2 1 | 2 | 1 3 1 | 3 | 2 | 3 | 2 1 | | $y_{26}$ |
| 27 | 3 | 3 | 2 1 | 3 | 2 1 2 | 1 | 3 | 1 | 3 2 | | $y_{27}$ |
| $K_i^F$ | $K_1^F$ $K_2^F$ $K_3^F$ | | | | | | | | | | $\sum_{i=1}^{n} y_i$ |
| $k_i^F$ | $k_1^F$ $k_2^F$ $k_3^F$ $R^F$ | | | | | | | | | | $\bar{y}$ |

The symbols in Table 3 are expressed as follows:

$$k_i^F = \frac{K_i^F}{9}$$

the range is:

$$R^F = \max\{|k_i^F - k_j^F|\}$$

3) The order of priority of the factors and interactions is determined according to $R^F$ in each column.

4) An optimal combination of levels of each evaluation index is selected according to $k_j^F$ in each column and with reference to a two-factor matching table.

5) An optimization solution is determined:

$$\begin{cases} \xi = \sum_{k=1}^{N} \lambda_k \xi_k \\ \xi_k \in [\xi_{min}, \xi_{max}] \end{cases}$$

wherein $\xi$ is a comprehensive evaluation index, $\xi_k$ is a single evaluation index, $\xi_{min}/\xi_{max}$ is upper/lower limit of the single evaluation index, and $\lambda_k$ is a weighting coefficient.

The hydro-mechanical transmission device of the present invention has three modes and 14 gear-shift processes. The shift of each gear is shown in FIG. 3.

The main parameters are:
$i_1 i_2 = i_3 i_4 = 1$, $i_5 i_6 = 2/3$, $i_7 i_8 = 2 = i_9 i_{13} = i_{14} i_{18} = 2.40$, $i_{10} i_{13} = i_{15} i_{18} = 0.60$, $i_{11} i_{12} i_{13} = i_{16} i_{17} i_{18} = 1.20$, $k_1 = 2.56$, $k_2 = 3.56$.

The output-input relationship in each gear is:

$$F(H): n_o[F(H)]en_e \quad (1)$$

$$R(H): n_o[F(H)]en_e \quad (2)$$

$$F_1(HM): n_o[F_1(HM)] = \frac{2.56 + 1.5e}{3.56 \times 2.40} n_e = \frac{2.56 + 1.5e}{8.544} n_e \quad (3)$$

$$F_2(HM): n_o[F_2(HM)] = \frac{4.56 + 0.5e}{3.56 \times 2.40} n_e = \frac{4.56 + 0.5e}{8.544} n_e \quad (4)$$

$$F_3(HM): n_o[F_3(HM)] = \frac{2.56 + 1.5e}{3.56 \times 0.60} n_e = \frac{2.56 + 1.5e}{2.136} n_e \quad (5)$$

$$F_4(HM): n_o[F_4(HM)] = \frac{4.56 + 0.5e}{3.56 \times 0.60} n_e = \frac{4.56 + 0.5e}{2.136} n_e \quad (6)$$

$$R_1(HM): n_o[R_1(HM)] = -\frac{2.56 + 1.5e}{3.56 \times 1.20} n_e = \frac{2.56 + 1.5e}{4.272} n_e \quad (7)$$

$$R_2(HM): n_o[R_2(HM)] = -\frac{4.56 + 0.5e}{3.56 \times 1.20} n_e = \frac{4.56 + 0.5e}{4.272} n_e \quad (8)$$

$$F_1(HM): n_o[F_1(HM)] = \frac{2.56}{3.56 \times 2.40} n_e = 0.300 n_e \quad (9)$$

$$F_2(HM): n_o[F_2(HM)] = \frac{4.56}{3.56 \times 2.40} n_e = 0.534 n_e \quad (10)$$

$$F_3(HM): n_o[F_3(HM)] = \frac{2.56}{3.56 \times 0.60} n_e = 1.199 n_e \quad (11)$$

$$F_4(HM): n_o[F_4(HM)] = \frac{4.56}{3.56 \times 0.60} n_e = 2.135 n_e \quad (12)$$

$$R_1(HM): n_o[R_1(HM)] = -\frac{2.56}{3.56 \times 1.20} n_e = -0.599 n_e \quad (13)$$

$$R_2(HM): n_o[R_2(HM)] = -\frac{4.56}{3.56 \times 1.20} n_e = -1.067 n_e \quad (14)$$

Figure 4:
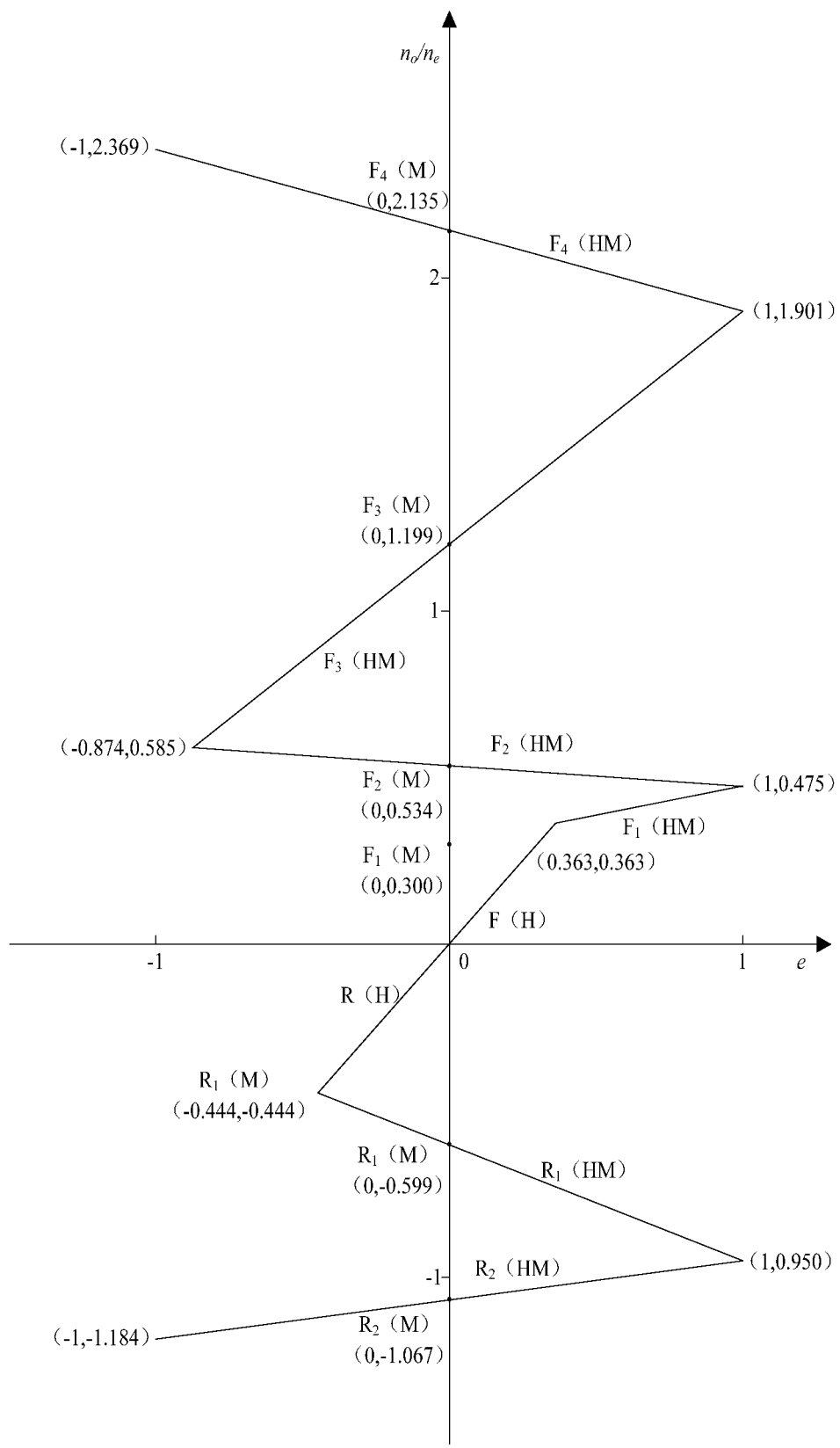
FIG. 4 is a schematic diagram showing characteristics of speed regulation in the present invention.

The speed regulation characteristics of the hydro-mechanical transmission device are shown in FIG. 4.

In forward speed regulation, the hydraulic gear F(H) is adopted for startup. When the displacement ratio of the pump-controlled motor mechanism is $e=0.363$, $n_o=0.363 n_e$, and the gear can be shifted to the first hydro-mechanical gear $F_1$(HM). The output speed $n_o$ of the first hydro-mechanical gear $F_1$(HM) increases linearly with the displacement ratio e of the pump-controlled motor mechanism. When $e=1$, $n_o=0.475 n_e$, and the gear can be shifted to the second hydro-mechanical gear $F_2$(HM). The output speed $n_o$ of the second hydro-mechanical gear $F_2$(HM) decreases linearly with the displacement ratio e of the pump-controlled motor mechanism. When $e=-0.874$, $n_o=0.585 n_e$, and the gear can be shifted to the third hydro-mechanical gear $F_3$(HM). The output speed $n_o$ of the third hydro-mechanical gear $F_3$(HM) increases linearly with the displacement ratio e of the pump-controlled motor mechanism. When $e=1$, $n_o=1.901 n_e$, and the gear can be shifted to the fourth hydro-mechanical gear $F_4$(HM). The output speed $n_o$ of the fourth hydro-mechanical gear $F_4$(HM) decreases linearly with the displacement ratio e of the pump-controlled motor mechanism. When $e=-1$, $n_o=20.369 n_e$.

In reverse speed regulation, the hydraulic gear R(H) is adopted for startup. When the displacement ratio of the pump-controlled motor mechanism 2 is $e=-0.444$, $n_o=-0.444 n_e$, and the gear can be shifted to the first hydro-mechanical reverse gear $R_1$(HM). The output speed n& of the first hydro-mechanical reverse gear $R_1$(HM) increases linearly with the displacement ratio e of the pump-controlled motor mechanism. When $e=1$, $n_o=-0.950 n_e$, and the gear can be shifted to the second hydro-mechanical reverse gear $R_2$(HM). The output speed $n_o$ of the second hydro-mechanical reverse gear $R_2$(HM) decreases linearly with the displacement ratio e of the pump-controlled motor mechanism. When $e=-1$, $n_o=-1.184 n_e$.

When a low-pressure large-flow pump or a high-pressure small-flow pump is used for joint driving, the displacement ratio e of the pump-controlled motor mechanism 2 is in a range wider than $e \in [-1, 1]$, resulting in higher forward and reverse speeds of a terminal.

In mechanical transmission, a dual-clutch mechanical transmission mode is adopted, wherein the relationships between the forward output speed and input speed are sequentially: $n_o=0.300 n_e$, $n_o=0.534 n_e$, $n_o=1.199 n_e$, and $n_o=2.135 n_e$, and the relationships between the reverse output speed and input speed are sequentially: $n_o=-0.599 n_e$ and $n_o=-1.067 n_e$.

In mechanical transmission, a dual-clutch mechanical transmission mode is adopted, wherein the shift from a low gear to a high gear involves four clutches, namely, the odd-numbered gear clutch $L_3$, the even-numbered gear clutch $L_7$, one odd-numbered gear clutch (the first gear clutch $L_4$, the third gear clutch $L_5$, or the first reverse-gear clutch $L_4$), and one even-numbered gear clutch (the second gear clutch LA, the fourth gear clutch $L_9$, or the second reverse-gear clutch $L_{10}$), and the engagement and disengagement of each clutch is independent. A three-level four-factor orthogonal analysis table $L_9(3^4)$ with no interaction can be adopted for analysis.

The above descriptions are preferred embodiments of the present invention, and are not intended to limit the present invention. Any obvious improvements, replacements, or modifications made by persons skilled in the art without departing from the essence of the present invention shall fall within the protection scope of the present invention.

What is claimed is:

1. A hydro-mechanical transmission device with a dual-clutch transmission, comprising:
    an input mechanism, a pump-controlled motor mechanism, an odd-numbered gear transmission mechanism, an even-numbered gear transmission mechanism, an output mechanism, and a jackshaft;
    wherein
    the input mechanism is connected to the odd-numbered gear transmission mechanism and the even-numbered gear transmission mechanism, and the input mechanism is connected to an input end of the pump-controlled motor mechanism;

an output end of the pump-controlled motor mechanism is connected, through the jackshaft, to the odd-numbered gear transmission mechanism and the even-numbered gear transmission mechanism, and the output end of the pump-controlled motor mechanism is connected to the output mechanism;

a first clutch is arranged between the input mechanism and the input end of the pump-controlled motor mechanism, a second clutch and a travel motor output brake are arranged between the output end of the pump-controlled motor mechanism and the jackshaft, and a third clutch is arranged between the jackshaft and the output mechanism;

the odd-numbered gear transmission mechanism comprises an odd-numbered gear planetary gear transmission assembly, an odd-numbered gear clutch, and an odd-numbered gear shift assembly;

the odd-numbered gear planetary gear transmission assembly comprises an odd-numbered gear planetary gear sun gear, an odd-numbered gear planetary gear planet carrier, and an odd-numbered gear planetary gear ring gear;

the odd-numbered gear planetary gear transmission assembly is connected to the jackshaft through the odd-numbered gear planetary gear sun gear;

the odd-numbered gear planetary gear transmission assembly is connected to the input mechanism through the odd-numbered gear planetary gear ring gear;

the odd-numbered gear planetary gear planet carrier is connected to the odd-numbered gear shift assembly through the odd-numbered gear clutch;

the odd-numbered gear shift assembly is connected to the output mechanism;

the even-numbered gear transmission mechanism comprises an even-numbered gear planetary gear transmission assembly, an even-numbered gear clutch, and an even-numbered gear shift assembly;

the even-numbered gear planetary gear transmission assembly comprises an even-numbered gear planetary gear sun gear, an even-numbered gear planetary gear planet carrier, and an even-numbered gear planetary gear ring gear;

the even-numbered gear planetary gear transmission assembly is connected to the jackshaft through the even-numbered gear planetary gear sun gear;

the even-numbered gear planetary gear transmission assembly is connected to the input mechanism through the even-numbered gear planetary gear planet carrier;

the even-numbered gear planetary gear ring gear is connected to the even-numbered gear shift assembly through the even-numbered gear clutch;

the even-numbered gear shift assembly is connected to the output mechanism;

the pump-controlled motor mechanism comprises a first variable pump, a second variable pump, a pilot-operated relief valve, a relief valve, a three-position four-way valve, a two-position three-way valve, a travel motor, and a power output motor;

the first variable pump has a greater flow than the second variable pump;

the pilot-operated relief valve is arranged in a first bypass oil circuit of the first variable pump;

the relief valve is arranged in a second bypass oil circuit of the second variable pump;

the second bypass oil circuit is communicated with the first bypass oil circuit;

the first bypass oil circuit and the second bypass oil circuit are communicated with the travel motor and the power output motor through the three-position four-way valve and the two-position three-way valve.

2. A method of operating the hydro-mechanical transmission device with the dual-clutch transmission according to claim 1, comprising switching among a hydraulic transmission mode, a hydro-mechanical transmission mode, and a mechanical transmission mode between the input mechanism and the output mechanism by controlling a combination and engagement/disengagement of the first clutch, the second clutch, the third clutch, the odd-numbered gear clutch, the even-numbered gear clutch, and the travel motor output brake, wherein:

in the hydraulic transmission mode, when the first clutch, the second clutch, and the third clutch are engaged while the odd-numbered gear clutch, the even-numbered gear clutch and the travel motor output brake are disengaged, power is transmitted through the pump-controlled motor mechanism and the jackshaft to the output mechanism;

in the mechanical transmission mode, when the first clutch, the second clutch, and the third clutch are disengaged while the travel motor output brake is engaged, the power is transmitted to the output mechanism through the odd-numbered gear transmission mechanism and the even-numbered gear transmission mechanism connected in parallel;

in the hydro-mechanical transmission mode, when the first clutch $L_0$ and the second clutch are engaged while the third clutch and the travel motor output brake are disengaged, the power is split into a first part and a second part, wherein the first part of the power passes through the pump-controlled motor mechanism to the jackshaft, and the second part of the power is transmitted to the odd-numbered gear transmission mechanism, the first part and the second part of the power are converged at the odd-numbered gear planetary gear transmission assembly and then transmitted through the odd-numbered gear clutch and the odd-numbered gear shift assembly to the output mechanism, or the first part of the power passes through the pump-controlled motor mechanism to the jackshaft, and the second part of the power is transmitted to the even-numbered gear transmission mechanism, the first part and the second part of the power are converged at the even-numbered gear planetary gear transmission assembly and then transmitted through the even-numbered gear clutch and the even-numbered gear shift assembly to the output mechanism.

3. The method of operating the hydro-mechanical transmission device with the dual-clutch transmission according to claim 2, wherein when the three-position four-way valve is in a left position and the two-position three-way valve is in a right position, the travel motor is connected with either the first bypass oil circuit or the second bypass oil circuit and rotates in a forward direction;

when the three-position four-way valve is in a right position and the two-position three-way valve is in the right position, the travel motor is connected with either the first bypass oil circuit or the second bypass oil circuit and rotates in a reverse direction;

when the three-position four-way valve is in the left position and the two-position three-way valve is in a left position, the travel motor and the power output motor are connected in series with either the first bypass oil circuit or the second bypass oil circuit and rotate in the forward direction;

when the three-position four-way valve is in the right position and the two-position three-way valve is in the left position, the travel motor and the power output motor are connected in series with either the first bypass oil circuit or the second bypass oil circuit and rotate in the reverse direction.

4. The method of operating the hydro-mechanical transmission device with the dual-clutch transmission according to claim 2, wherein the odd-numbered gear shift assembly comprises a first gear shift assembly, a third gear shift assembly, and a first reverse-gear shift assembly connected in parallel;

the first gear shift assembly comprises a first gear clutch, the third gear shift assembly comprises a third gear clutch, and the first reverse-gear shift assembly comprises a first reverse-gear clutch;

the even-numbered gear shift assembly comprises a second gear shift assembly, a fourth gear shift assembly, and a second reverse-gear shift assembly connected in parallel;

the second gear shift assembly comprises a second gear clutch, the fourth gear shift assembly comprises a fourth gear clutch, and the second reverse-gear shift assembly comprises a second reverse-gear clutch;

in a first mechanical transmission gear or a first hydro-mechanical transmission gear, only the odd-numbered gear clutch and the first gear clutch are engaged, and the power passes through the odd-numbered gear clutch and the first gear shift assembly to the output mechanism;

in a second mechanical transmission gear or a second hydro-mechanical transmission gear, only the even-numbered gear clutch and the second gear clutch are engaged, and the power passes through the even-numbered gear clutch and the second gear shift assembly to the output mechanism;

in a third mechanical transmission gear or a third hydro-mechanical transmission gear, only the odd-numbered gear clutch and the third gear clutch are engaged, and the power passes through the odd-numbered gear clutch and the third gear shift assembly to the output mechanism;

in a fourth mechanical transmission gear or a fourth hydro-mechanical transmission gear, only the even-numbered gear clutch and the fourth gear clutch are engaged, and the power passes through the even-numbered gear clutch and the fourth gear shift assembly to the output mechanism;

in a fifth mechanical transmission gear or a fifth hydro-mechanical transmission gear, only the odd-numbered gear clutch and the first reverse-gear clutch are engaged, and the power passes through the odd-numbered gear clutch and the first reverse-gear shift assembly to the output mechanism;

in a sixth mechanical transmission gear or a sixth hydro-mechanical transmission gear, only the even-numbered gear clutch and the second reverse-gear clutch are engaged, and the power passes through the even-numbered gear clutch and the second reverse-gear shift assembly to the output mechanism.

* * * * *